(12) United States Patent
Prabhat et al.

(10) Patent No.: US 9,747,010 B2
(45) Date of Patent: Aug. 29, 2017

(54) ELECTRONIC CONTENT VISUAL COMPARISON APPARATUS AND METHOD

(71) Applicant: Xerox Corporation, Norwalk, CT (US)

(72) Inventors: Saurabh Prabhat, Webster, NY (US); Jennifer Watts-Englert, Pittsford, NY (US); Reiner Eschbach, Webster, NY (US); Emil V. Rainero, Webster, NY (US); Kenton K. Hofmeister, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 855 days.

(21) Appl. No.: 14/156,710

(22) Filed: Jan. 16, 2014

(65) Prior Publication Data
US 2015/0199113 A1     Jul. 16, 2015

(51) Int. Cl.
G06F 3/048 (2013.01)
G06F 3/0484 (2013.01)
G06F 3/0488 (2013.01)
G06F 3/0486 (2013.01)
G06F 3/0481 (2013.01)

(52) U.S. Cl.
CPC ........ *G06F 3/04842* (2013.01); *G06F 3/0484* (2013.01); *G06F 3/0486* (2013.01); *G06F 3/0488* (2013.01); *G06F 3/04817* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 5,694,532 A * | 12/1997 | Carey | ................ G06F 3/04842 345/419 |
| 5,748,904 A | 5/1998 | Huang et al. | |
| 5,867,208 A | 2/1999 | McLaren | |
| 6,035,324 A | 3/2000 | Chang et al. | |
| 6,314,452 B1 | 11/2001 | Dekel et al. | |
| 6,449,639 B1 | 9/2002 | Blumberg | |
| 6,501,472 B1 | 12/2002 | Hunt et al. | |
| 6,539,547 B2 | 3/2003 | Driscoll, Jr. et al. | |
| 6,683,980 B1 | 1/2004 | Meier et al. | |
| 6,690,403 B1 | 2/2004 | Tuli | |
| 6,708,309 B1 | 3/2004 | Blumberg | |
| 6,792,607 B1 | 9/2004 | Burd et al. | |
| 6,961,750 B1 | 11/2005 | Burd et al. | |
| 7,200,615 B2 | 4/2007 | Eschbach et al. | |
| 7,284,069 B2 | 10/2007 | Buckley et al. | |

(Continued)

FOREIGN PATENT DOCUMENTS

| | | |
|---|---|---|
| EP | 0801359 B1 | 1/2000 |
| WO | 0024188 | 4/2000 |
| WO | 0072517 A1 | 11/2000 |

*Primary Examiner* — Tuan S Nguyen
(74) *Attorney, Agent, or Firm* — Fay Sharpe LLP

(57) ABSTRACT

Methods and apparatus are presented for visual comparison of different portions of one or more source documents to emulate a paper folding gesture experience in a user device, in which the user uses a mouse or finger in a touchscreen device to circle two or more portions of interest in the same or separate source documents, and provides a different user input such as a pinch motion or zoom in feature to display the selected regions proximate one another for visual comparison.

19 Claims, 25 Drawing Sheets

(56) References Cited

U.S. PATENT DOCUMENTS

| | | |
|---|---|---|
| 7,529,755 B2 | 5/2009 | Buckley et al. |
| 7,797,455 B2 | 9/2010 | Buckley et al. |
| 7,904,513 B2 | 3/2011 | Kanda et al. |
| 7,975,221 B2 | 7/2011 | Buckley et al. |
| 8,019,897 B2 | 9/2011 | Buckley et al. |
| 8,169,628 B2 | 5/2012 | Ziegler et al. |
| 2004/0030741 A1 | 2/2004 | Wolton et al. |
| 2012/0173963 A1* | 7/2012 | Hoke ............... G06F 17/30905 715/234 |
| 2014/0043298 A1* | 2/2014 | Park .................... G06F 3/0416 345/175 |
| 2014/0055376 A1* | 2/2014 | Baek ................... G06F 3/0488 345/173 |
| 2014/0229891 A1* | 8/2014 | O'Byrne ............. G06F 9/4443 715/790 |
| 2015/0063679 A1* | 3/2015 | Cook ................ G06F 3/04815 382/154 |

* cited by examiner

ELECTRONIC CONTENT VISUAL COMPARISON APPARATUS AND METHOD

BACKGROUND

The present exemplary embodiments relate to tools and techniques for viewing documents on display screens. People often print physical copies of documents in order to visually examine content located in different places within a document, or to compare visual content located in different documents. The same is true of other electronic source files, such as PDF files, slideshow presentation files, electronic drawing files, web page content, etc. Different content portions in a given printed page can then be brought together by folding the paper or in other ways. For example, certain bits of content may be physically cut from a paper printout, and the bits can be laid out together on a table for examination and comparison. Conventional software tools provide some limited capability for comparing disparate portions of a source document or of different documents, such as by opening separate windows next to each other, each containing an instance of the entire document, but the user must navigate the display of each window to a corresponding portion to be compared. Certain word processors and spreadsheet programs provide means for placing different portions of a file in proximity, such as by creating a "split screen" view of a document, or by selectively freezing and/or hiding specific rows or columns of a spreadsheet file. U.S. Pat. No. 7,200,615 to Eschbach et al., assigned to Xerox Corporation, incorporated herein by reference, provides techniques for presenting spreadsheets and other documents on client-side devices with limited resources and tiny display screen area, with a split-bar stitched into a composite view of the user's current viewpoint. However, such tools and multiple window techniques may not be available on all user devices, such as smart phones, etc. Moreover, available tools do not allow direct comparison of arbitrary portions of two or more commonly used file formats, and do not allow side-by-side comparison of specific portions of a digital file that are far apart or are not aligned. Accordingly, a need remains for improved tools and techniques for comparing multiple disparate portions of one or more source files to facilitate a user visually comparing select portions without opening multiple windows in a user device and without printing out the files.

BRIEF DESCRIPTION

The present disclosure provides apparatus and methods for comparing user-selected source file portions within a single user interface display rendering or window by which the above and other shortcomings of conventional tools and techniques can be mitigated or overcome. Computer-implemented processes and a user device software tool are disclosed for visual comparison of content in which a user input, such as an encircling motion on a touchscreen display or mouse action, etc. which identifies a selected visual content area in a display view, initiates generation of a first boundary defining a first content region that includes visual content identified by the visual content area. In response to receipt of a user input identifying a second selected visual content area in the same or another display view, of the same source file or of a different source file, the tool generates a second boundary defining a second content region. Receipt of a further user input, such as a pinching motion on a touchscreen display, etc., brings the first and second content regions together on the display, with the regions approaching one another and sliding relative to one another to final positions for visual user comparison.

One or both of the content regions is/are automatically resized in certain embodiments according to the relative content region sizes, the size of the display, and the current display orientation (e.g., landscape versus portrait). In this manner, the user is presented with potentially maximal visibility to enhance the visual comparison operation without having to adjust zoom levels manually. Certain embodiments, moreover, allow further user input to adjust the position in the original content by changing the center point in the content of a given content region, to change a zoom level of a given content region and/or change the size of a given content region, thereby providing further flexibility in the user experience beyond those available with conventional applications and/or by folding printed paper. In certain embodiments, the user can identify three or more content areas in one or more source files for contemporaneous comparison on a single display view, and may be presented with a palette of the selected content regions with the ability to perform a further user input operation (e.g., a pinching operation on a touchscreen) to compare two particular content areas that have been identified. Further aspects of the disclosure provide computer readable mediums with computer executable instructions for implementing the software tool or comparison process, as well as user devices programmed to implement these concepts.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1A:
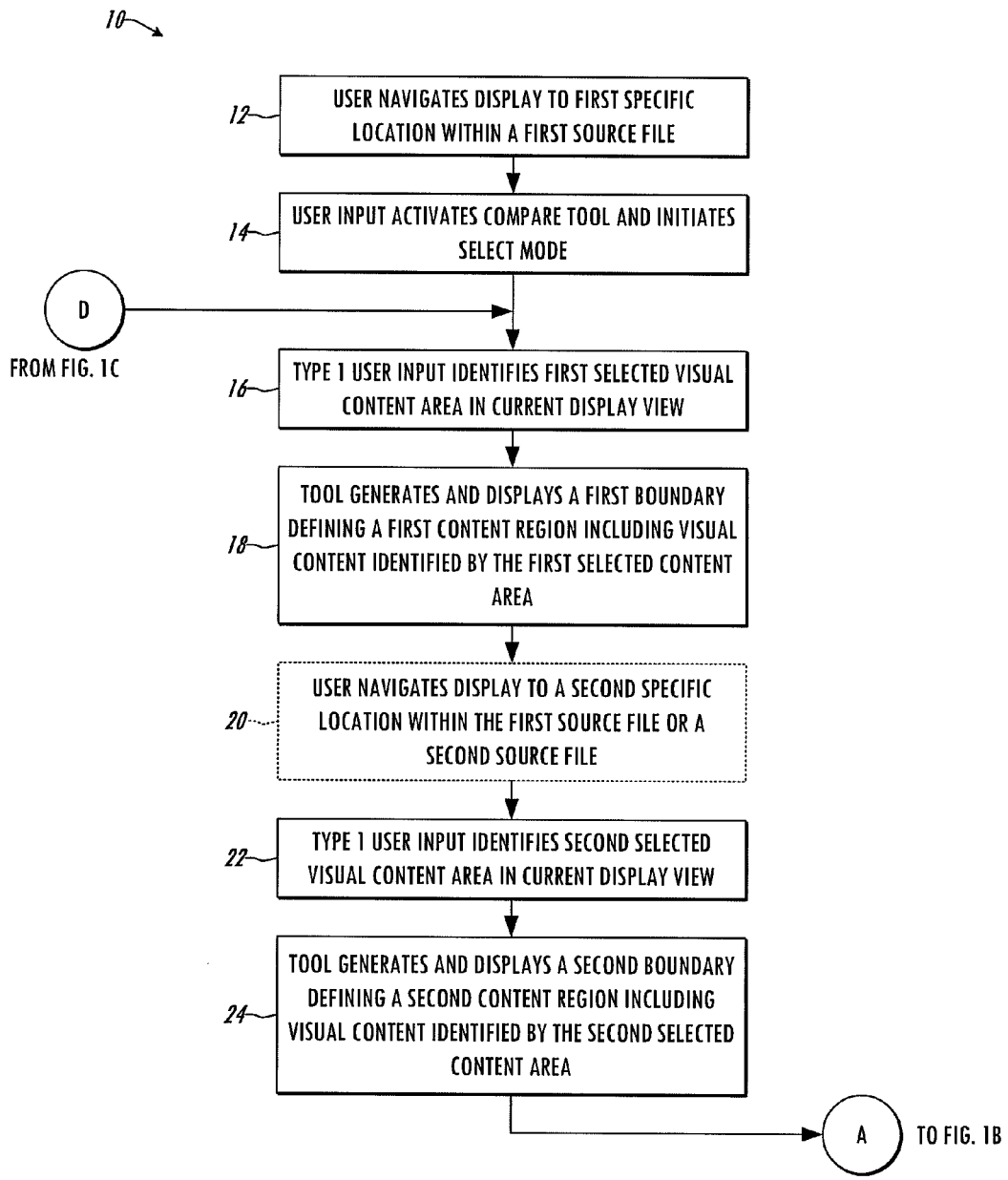
FIGS. 1A-1D depict a flow diagram illustrating an exemplary method for visually comparing multiple user identified portions of a document or documents using a computer-implemented system with a visual display in accordance with one or more aspects of the present disclosure.

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale. The disclosure provides computer-implemented methods and apparatus for comparing different portions of one or more source documents or files, and finds particular utility in connection with user devices having small display screens, such as laptop computers, tablet computers, netbooks, smart phones, cell phones, smart watches, PDAs, etc., although the various concepts of the present disclosure may be implemented in any processor-based system having a visual display.

Referring initially to FIGS. 1A-1D and 2-4, an exemplary method or process 10 is illustrated in FIGS. 1A-1D for comparing select portions of one or more source files in accordance with one or more aspects of the present disclosure. While the method 10 and other methods of the disclosure are illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 10 and other methods of the disclosure may be implemented in hardware, processor-executed software, processor-executed firmware, programmable logic, etc. or combinations thereof, whether in a single component or system or in distributed form in two or more components or systems, and may be employed in association with any form of user device, wherein the disclosure is not limited to the specific devices, systems, applications, and implementations illustrated and described herein. Moreover, the disclosure contemplates computer readable mediums with computer executable instructions for performing the various methods including the method 10 illustrated and described below in connection with FIGS. 1A-1D.

Figure 2:
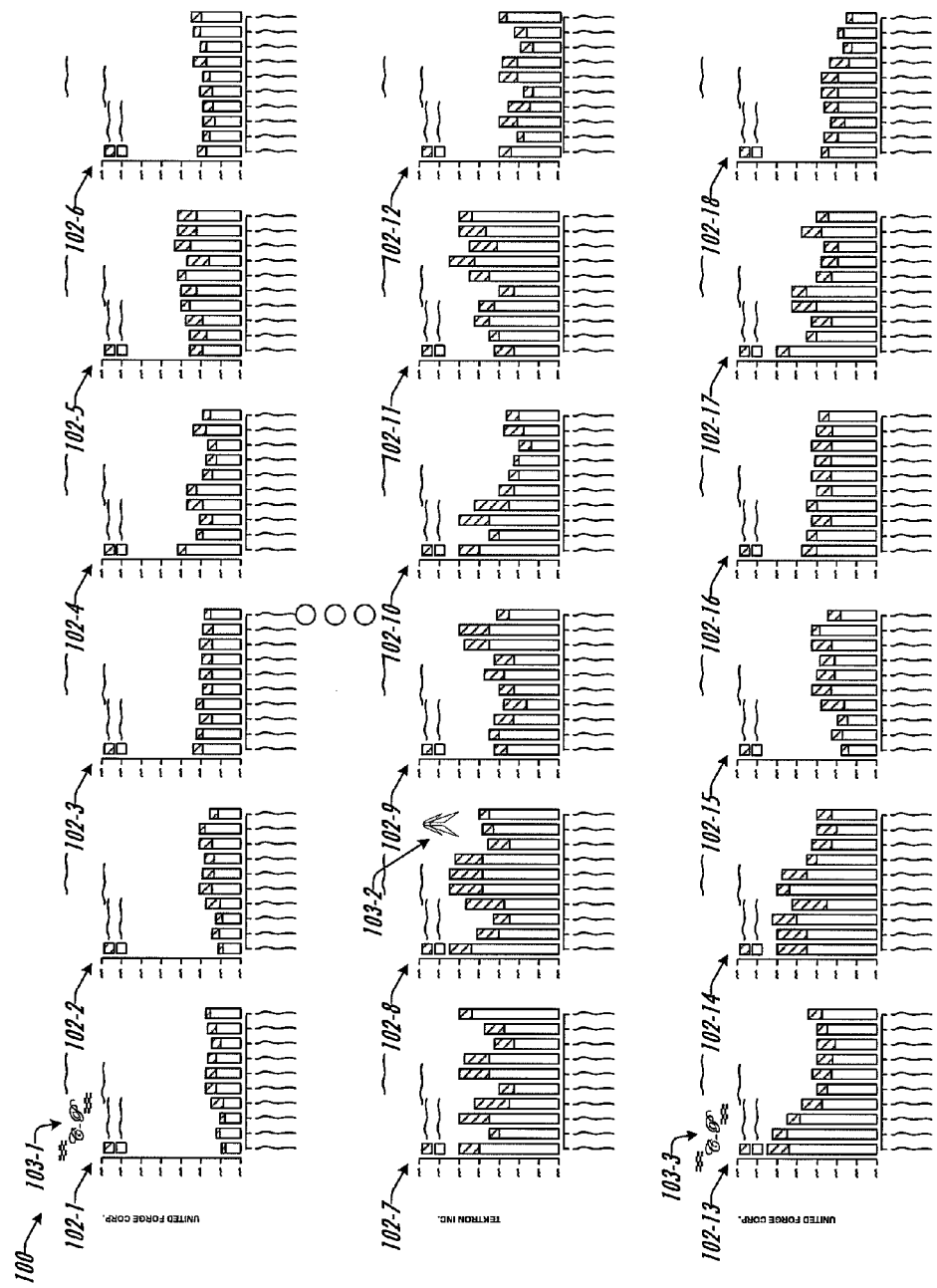
FIG. 2 illustrates various textual and graphical content in a first source file accessed by the computer-implemented system.
Figure 3:
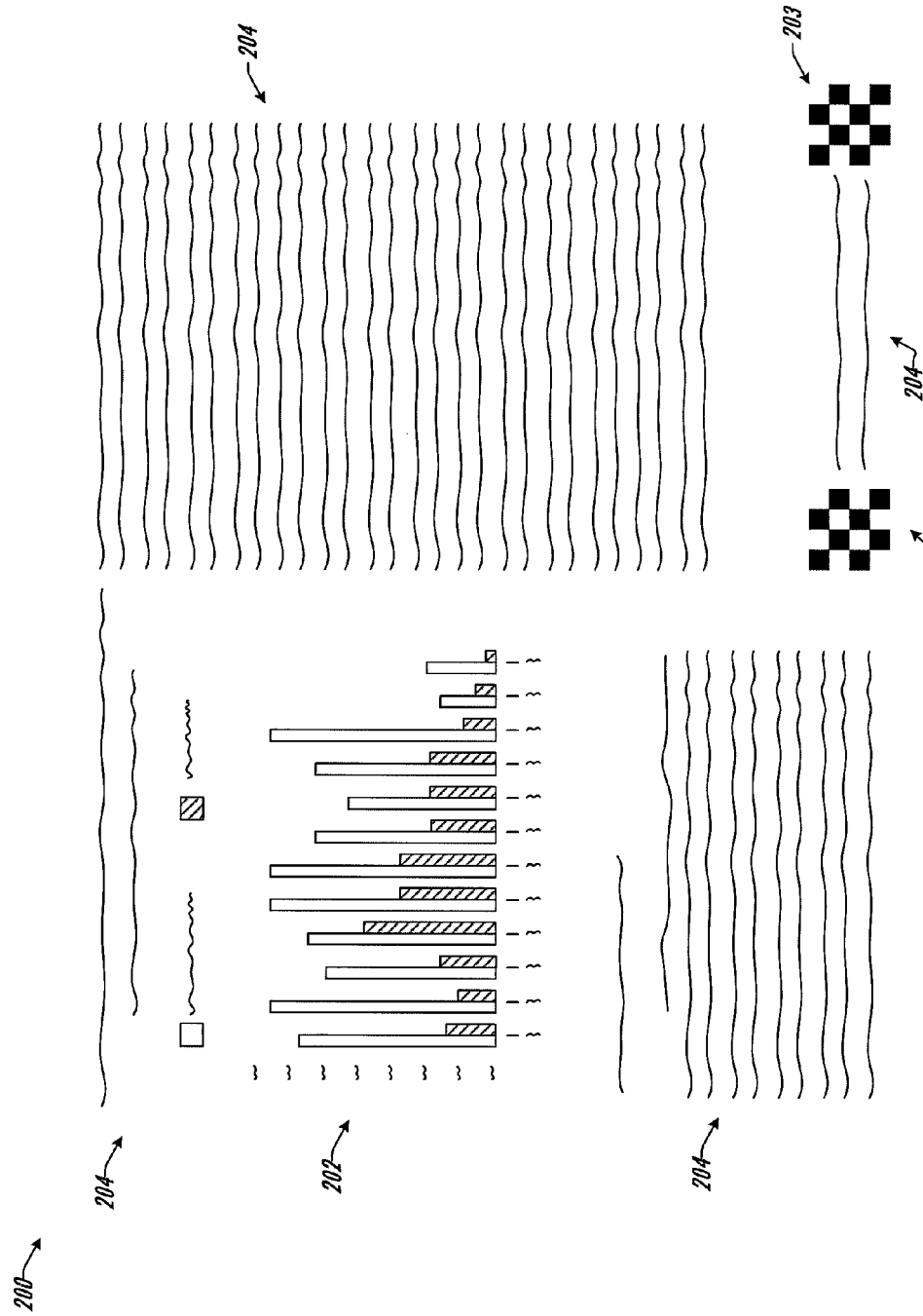
FIG. 3 illustrates textual and graphical content in a second source file accessed by the computer-implemented system.

FIG. 2 illustrates two different portions of an exemplary source file 100, including graphical and textual components. In this example, various financial data is illustrated for different corporations, including bar graphs representing profit and revenue during specific time periods for various divisions of the corporations. As seen in FIG. 2, for instance, bar graphs 102-1 through 102-18 are presented for various corporate divisions over certain time ranges, and the content of the source file 100 includes graphical elements 103-1 through 103-3 associated with certain of the bar graph content portions 102. FIG. 3 shows a second source file 200, having a bar graph portion 202, as well as textual portions 204, and graphical portions 203. Although two non-limiting source files 100, 200 are illustrated in FIGS. 2 and 3, any suitable form or type of source file may be used in connection with the processes and apparatus of the present disclosure, including without limitation document files, drawing files, slideshow presentation files, PDF files, webpages, etc.

Figure 4:
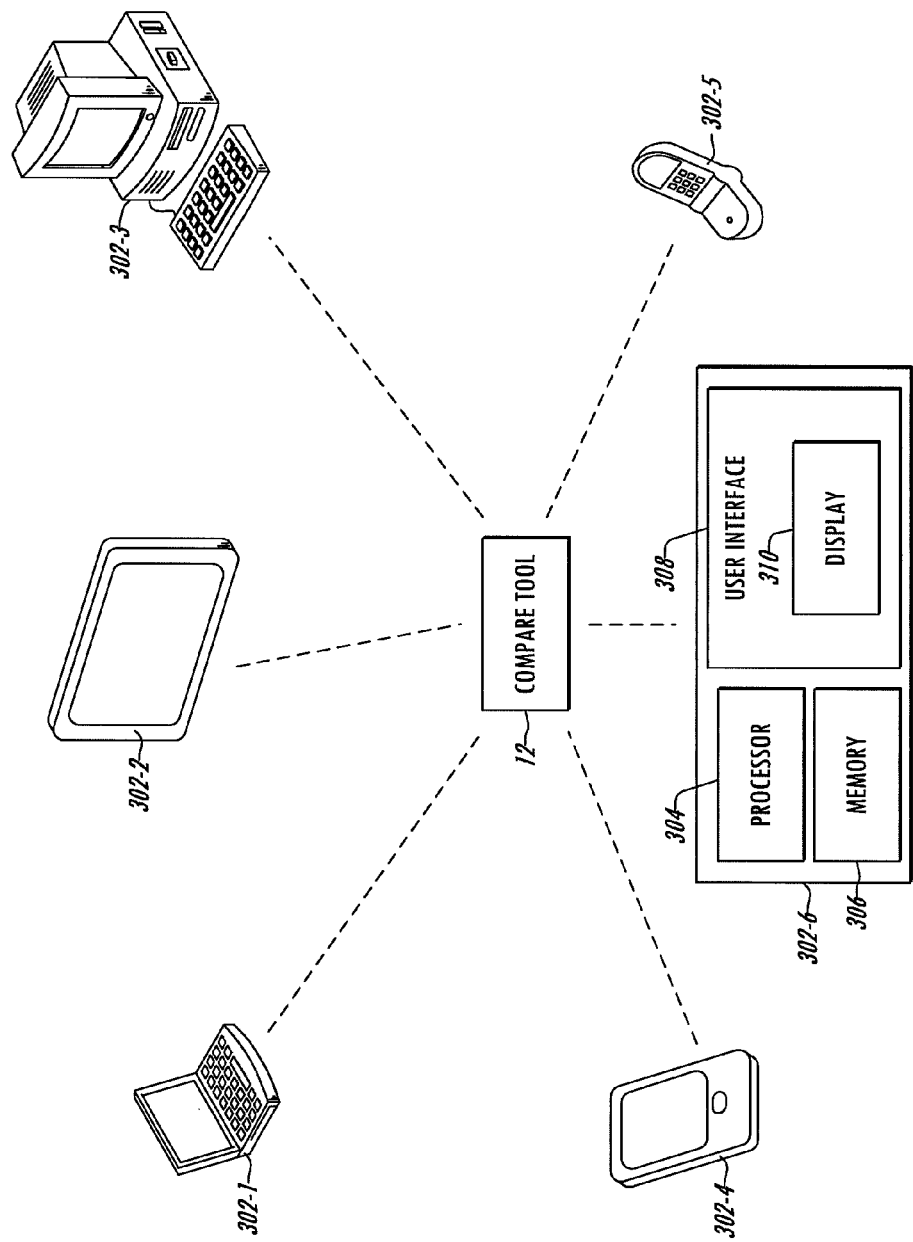
FIG. 4 is a simplified schematic diagram illustrating exemplary computer-implemented systems in which the process of FIGS. 1A-1D can be implemented to provide a computer-implemented comparison tool.

FIG. 4 shows various user devices including a laptop computer 302-1, a tablet computer 302-2, a desktop computer 302-3, a smart phone 302-4, a cell phone 302-5, and a schematic representation of a user device 302-6. Each of the user devices 302 is equipped with one or more processing elements 304, such as a microprocessor, microcontroller, programmable logic, PGA, ASIC, or combinations thereof, as well as an associated electronic memory 306. In addition, the user devices 302 also include some form of user interface 308 allowing interaction with a user, and including a graphical display 310, where the user interface 308 may comprise a touch screen display 310 along with one or more other user input features, or the touchscreen display 310 may be implemented so as to provide all the user input capabilities. The user devices 302, moreover, may include various connectivity features, non-limiting examples of which include network ports for wired connection to a network router, wireless capabilities allowing wireless connection to Wi-Fi, 3G, 4G or other forms of wireless radio access network, with the ability to connect to one or more external networks such as the Internet. Moreover, the user devices 302 may be equipped with suitable power circuitry and other components as are known for implementing various user functions, such as running applications, providing telecommunications functionality for placing and receiving calls, video conferencing, web browsing, etc.

Figure 5:
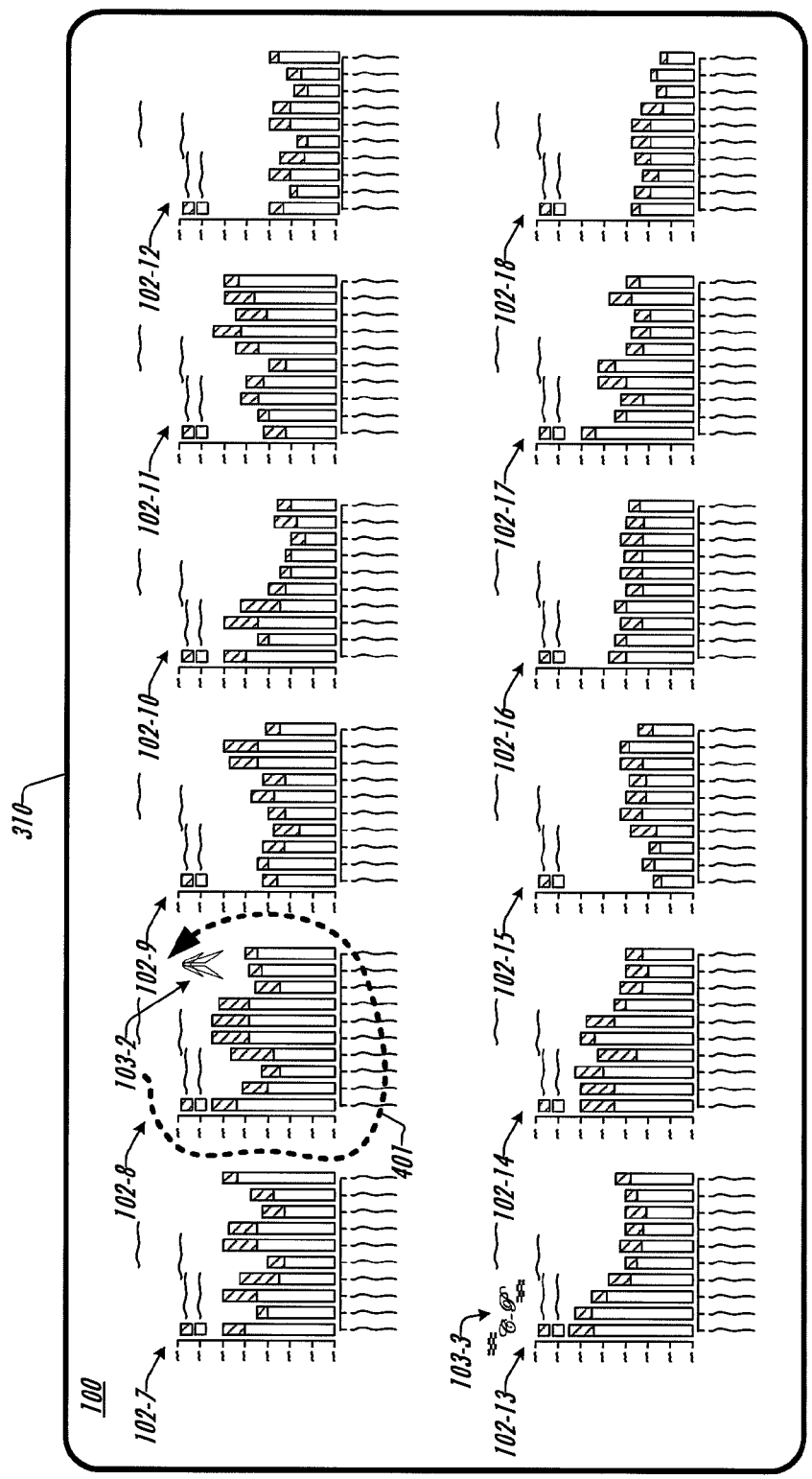
FIG. 5 is a simplified display view provided by the comparison tool illustrating a first type of user input in a selection mode to identify a first selected visual content area in the source file of FIG. 2.

Referring now to FIGS. 1A and 5-8, the method 10 begins in FIG. 1A with a user navigating a user device display at 12 to a first location within a source file. As seen in FIG. 5, for instance, the user may be viewing the illustrated portion of a document file 100 (e.g., source file 100 from FIG. 2), with a current landscape orientation of the user device display 310 and a current user device zoom level sufficient to show the content elements 102-7 through 102-18 as well as associated graphical elements 103-2 and 103-3. In a touchscreen user device example, the user may employ various types of touch inputs to the display 310 to navigate the displayed portion of the source file 100 as are known at 12 in FIG. 1A. At 14 in the process 10, the user employs one or more input actions to activate a compare tool, such as through menu selection, etc. (not shown). In addition, the user initiates or begins a "SELECT" mode at 14, for example, through a further user input action, or the compare tool may automatically begin execution in this mode for selection of user-identified regions of interest within the source file 100.

At 16 in FIG. 1A, a first type of user input ("TYPE 1") is employed by the user to identify a first selected visual content area in the current display view. The first user input type may be any suitable user interface interaction by which a user can identify a selected visual content area in the display. For example, as seen in FIG. 5, the user may employ a mouse or touchscreen action 401 to define or otherwise identify a content area of interest. In this example, the user has performed an encircling motion via a touchscreen display 310 to identify a portion of the displayed content in the source file 100 which includes the bar graph 102-8 as well as the associated logo graphic element 103-2 pertaining to profit and revenue financial information for a Commercial Products Division of a company.

Figure 6:
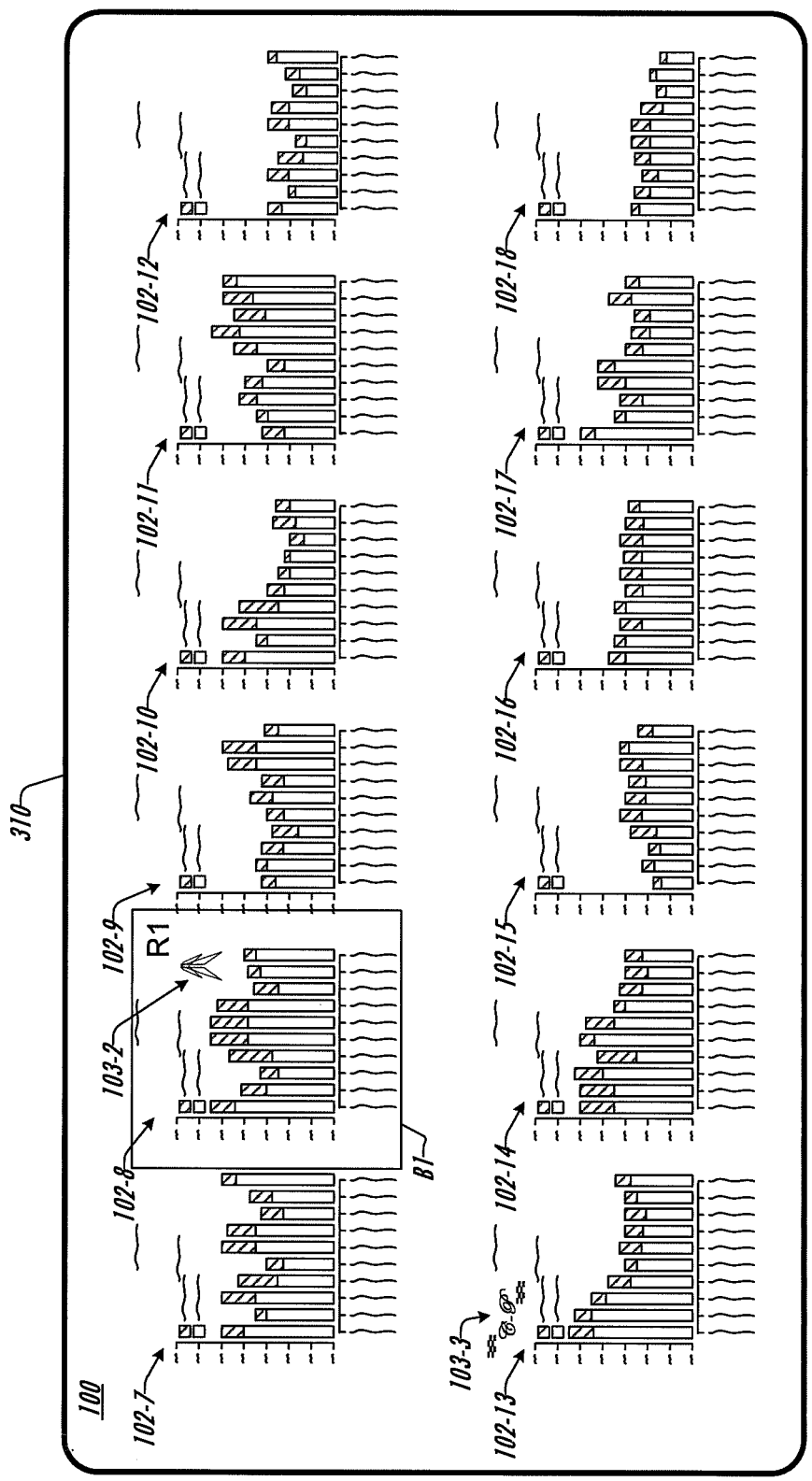
FIG. 6 is a simplified display view showing generation by the comparison tool of a first boundary defining a first content region including visual content identified by the first user-selected content area of FIG. 5.

In response to this user input at 16, the compare tool of the user device generates and displays a first boundary B1 at 18 in FIG. 1A, as shown in FIG. 6, which defines a first content region R1 including visual content identified by the content area selected by the user in FIG. 5. In this case the boundary B1 is rectangular, although circular boundaries and corresponding regions can be implemented, as well as boundaries and regions of various other forms and shapes, or combinations thereof. In certain implementations, the software compare tool may employ various algorithms for generating the boundary B1 based on a substantially free hand user input (e.g., the user input 401 identified in FIG. 5), for example by defining a bounding box that includes all the touched portions identified by the user input 401 to define a region that at least includes this amount of source file content, although other approaches may be employed within the scope of the present disclosure. In other possible examples, the type 1 user input could be performed using a mouse or other pointing device, or through voice commands, etc., by which a user defines a first corner of a bounding box and then defines an opposite corner of a bounding box, and with this input, the compared tool creates the boundary B1 at 18 in FIG. 1A.

In the illustrated example, moreover, the tool provides a graphical identifier of the defined first region R1, for example, by displaying "R1" within or proximate to the boundary line B1. Other implementations are possible in which any suitable form of identification may be used by which the user can determine a region of the source document 100 that has been previously identified through user selection. In this example, moreover, the tool-generated boundary B1 is graphically shown to the user by way of the box line, although other graphical techniques can be used by which the user can distinguish regions R that have been selected from other regions within the source file 100.

Figure 7:
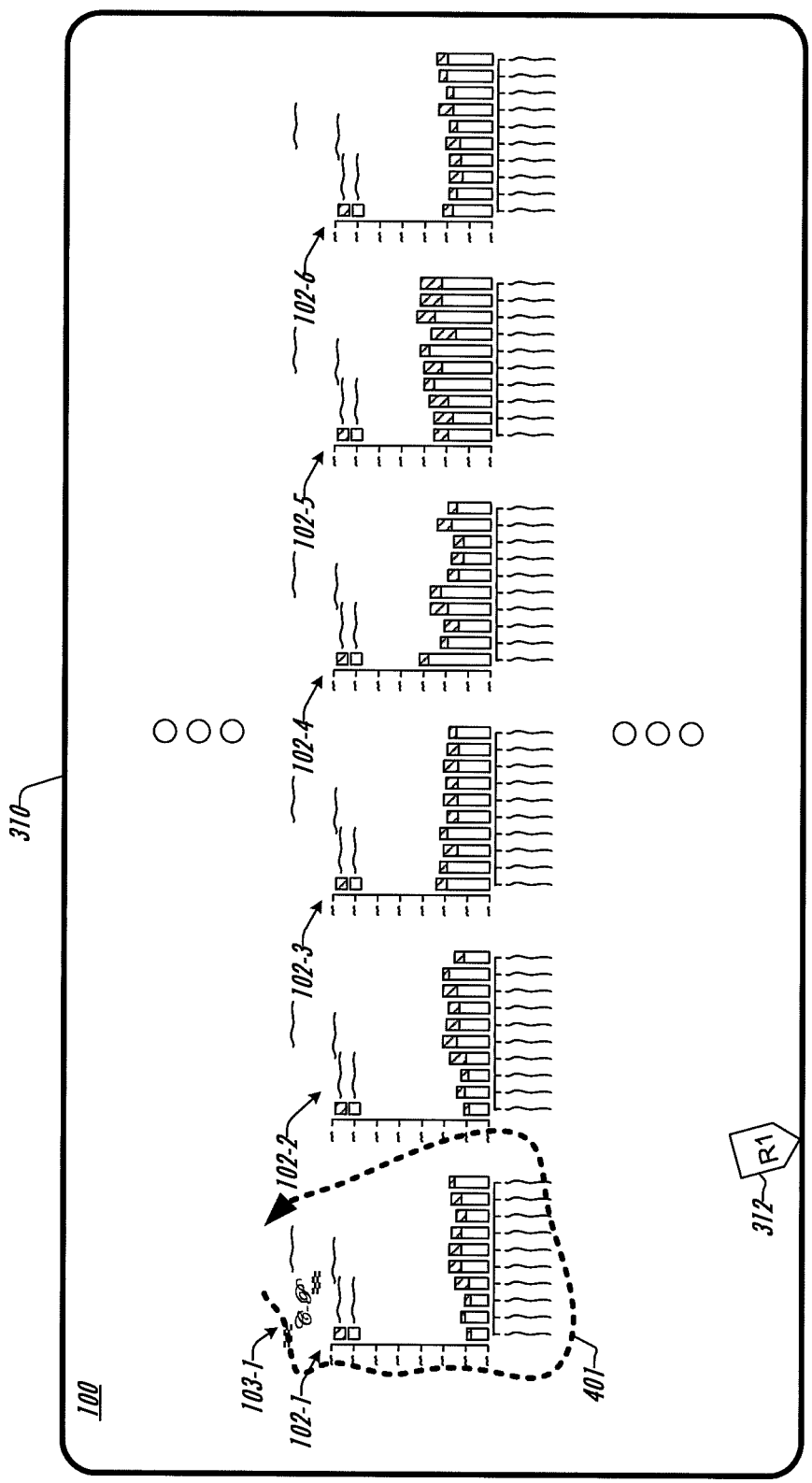
FIG. 7 is a simplified display view illustrating user input in the selection mode to identify a second selected visual content area in a different location of the source file of FIG. 2.
Figure 8:
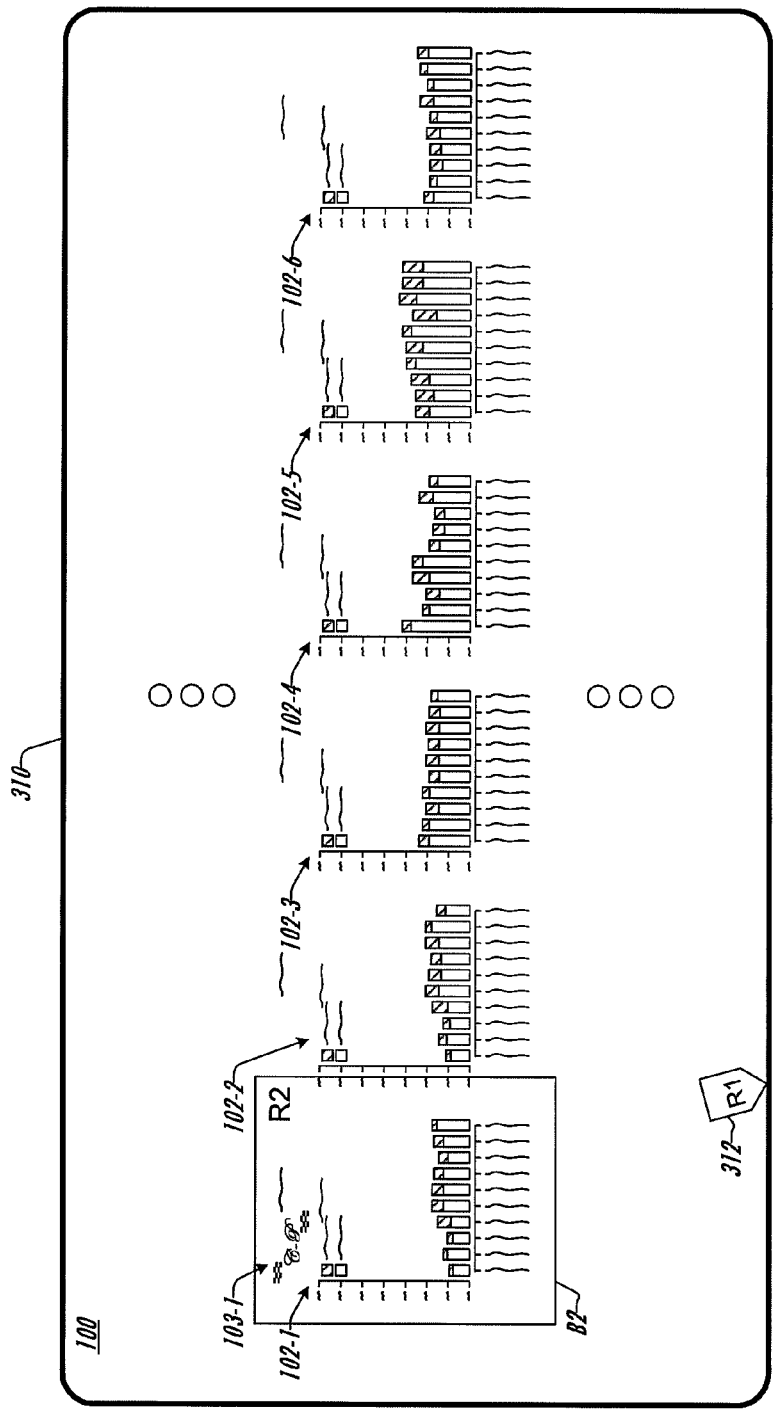
FIG. 8 is a simplified display view showing generation by the comparison tool of a second boundary defining a second content region including visual content identified by the second user-selected content area of FIG. 7.

Referring also to FIGS. 7 and 8, at 20 in FIG. 1A, the user may optionally navigate the display to a second location in the first source file 100, or may use the user device to open a second source file (e.g., file 200 of FIG. 3 above). In particular, the user may navigate until another portion of a source document 100, 200 is shown in the display, which the user would like to compare with the first identified region R1 in the first boundary B1. In the example of FIG. 7, the user has navigated the content presented in the display 310 of the source file 100 to a different location which does not include the previously identified first region R1. Accordingly, the compare tool in this example advantageously provides a region identifier 312 on the display 310 to indicate the relative positioning of the previously identified region R1, even though the region R1 itself is not currently displayed.

At 22 in FIG. 1A, a further user input of the first type (TYPE 1) is used by which a second selected visual content area is identified in the current display view. In this case, like that of FIG. 5 above, the user performs an encircling operation by way of a touchscreen display 310, or using a mouse, or other user input means, indicated in dashed line at 401 in FIG. 7. In this case, the user has selected a bar graph content portion 102-1 with associated graphical element 103-1 relating financial profit and revenue information for a consumer products division of a second company. At 24 in FIG. 1A, the compare tool generates and displays a second boundary B2 and a second identified region indicator "R2" as shown in FIG. 8.

At this point, as seen in FIG. 8, the user cannot concurrently view both identified regions R1 and R2, due to the current zoom level and display orientation, as well as to the lack of proximity within the source file 100 of these two identified regions. However, the rendering in FIG. 8 advantageously shows the user that two regions have been identified via the display of the boundary B2 and associated content, as well as the indicator 312 which notifies the user that there is another region currently off screen which may be compared to the most recently identified region R2. While the first and second content regions R1 and R2 were both identified in the same source file 100, the processes and compare tool of the present disclosure may be employed where regions of interest are within two separate source files (e.g., source file 100 of FIG. 2 and source file 200 in FIG. 3 above), and the tool may advantageously display the indicator(s) 312 to always indicate to the user that one or more other regions have been previously identified and are available for comparison.

Figure 1B:
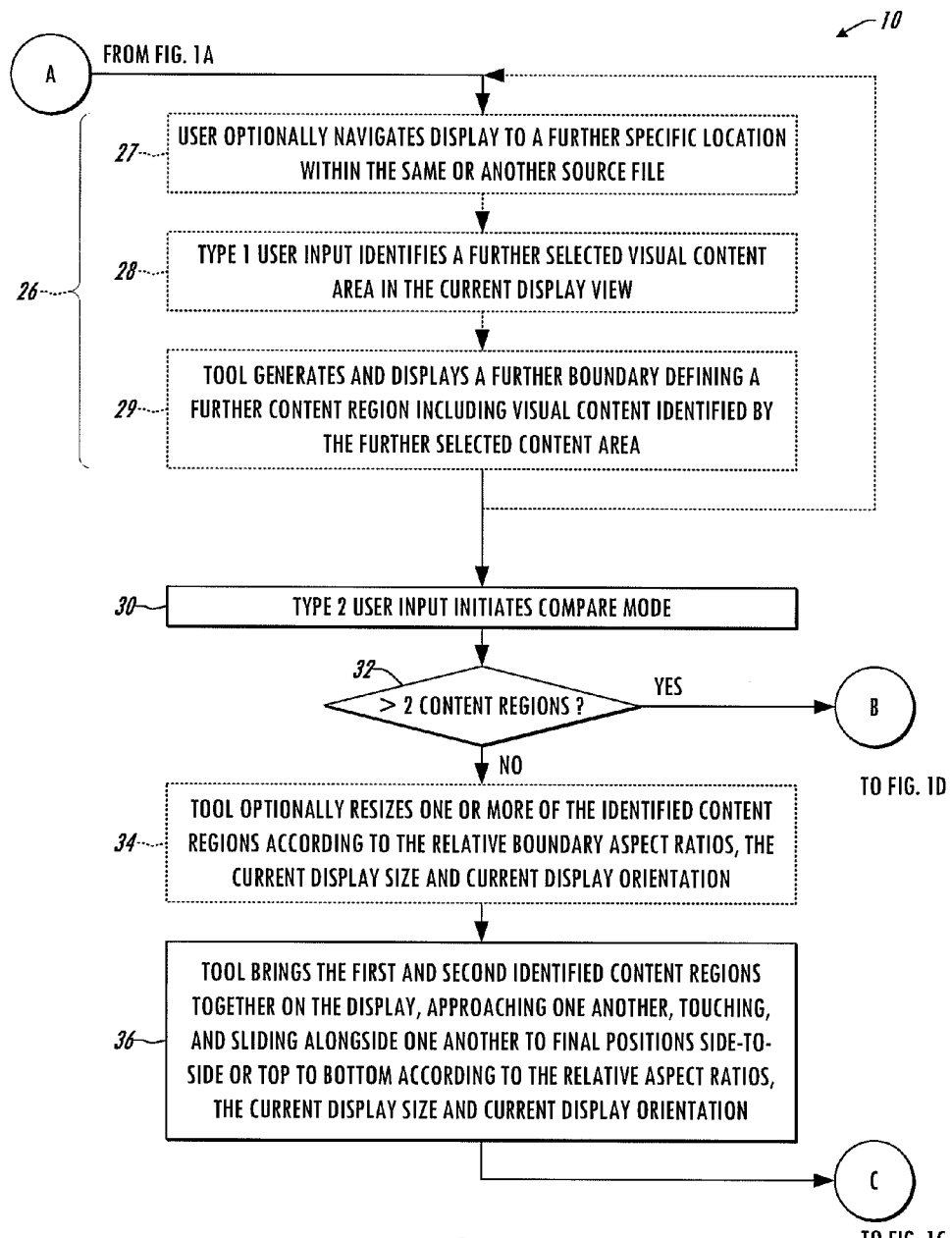
Figure 9:
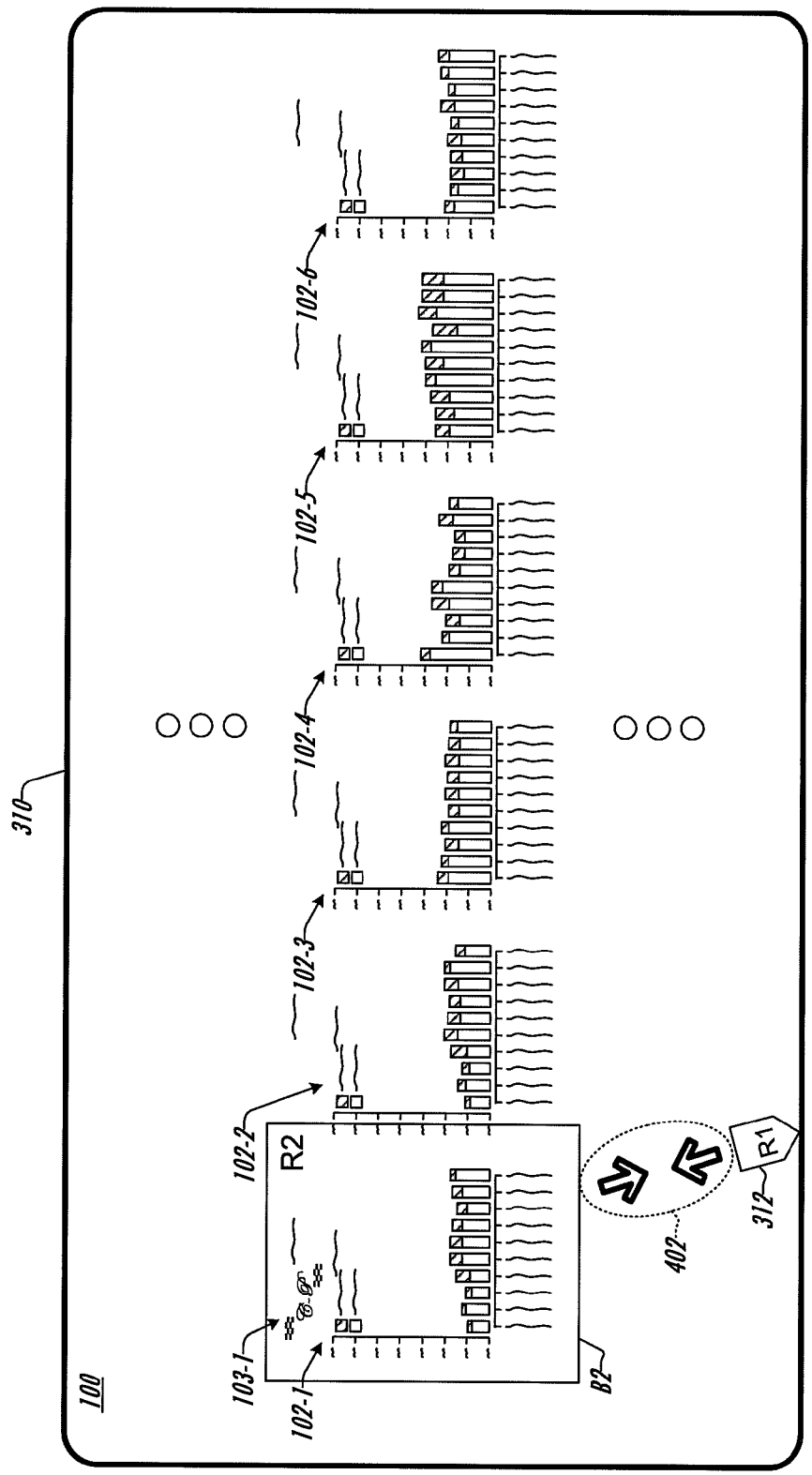
FIG. 9 is a simplified display view showing a user input to initiate a comparison mode of the tool for comparing the visual content regions identified in FIGS. 6 and 8.

Referring now to FIGS. 1B and 9-12, the process 10 continues at 26 in FIG. 1B, where the user may optionally identify a third and subsequent content regions R. In other implementations, the compare tool may automatically bring the first and second identified regions R1 and R2 together for visual comparison automatically, without allowing the user to identify a third region. In the illustrated example, the process 10 allows the user to initiate a second type of user input (TYPE 2) at 30 in FIG. 1B in order to initiate or begin a comparison or COMPARE mode of operation. As seen in FIG. 9, for instance, the second type of user input may be a pinching type operation graphically illustrated at 402 in FIG. 9, although any suitable second type of user input action may be employed by which the user indicates a desire to compare two identified content regions R1 and R2. As seen in FIG. 9, moreover, a pinching operation is particularly intuitive and advantageous in a touchscreen implementation, with the user touching two separate portions of the touchscreen display 310 and sliding at least one of the touched portions toward the other touched portion. For example, this operation 402 may be similar in some respects to a "zoom out" feature used in touchscreen implementations of various applications, such as maps or documents, whereby this form of user input 402 is relatively natural to users of touchscreen devices 302.

Figure 10:
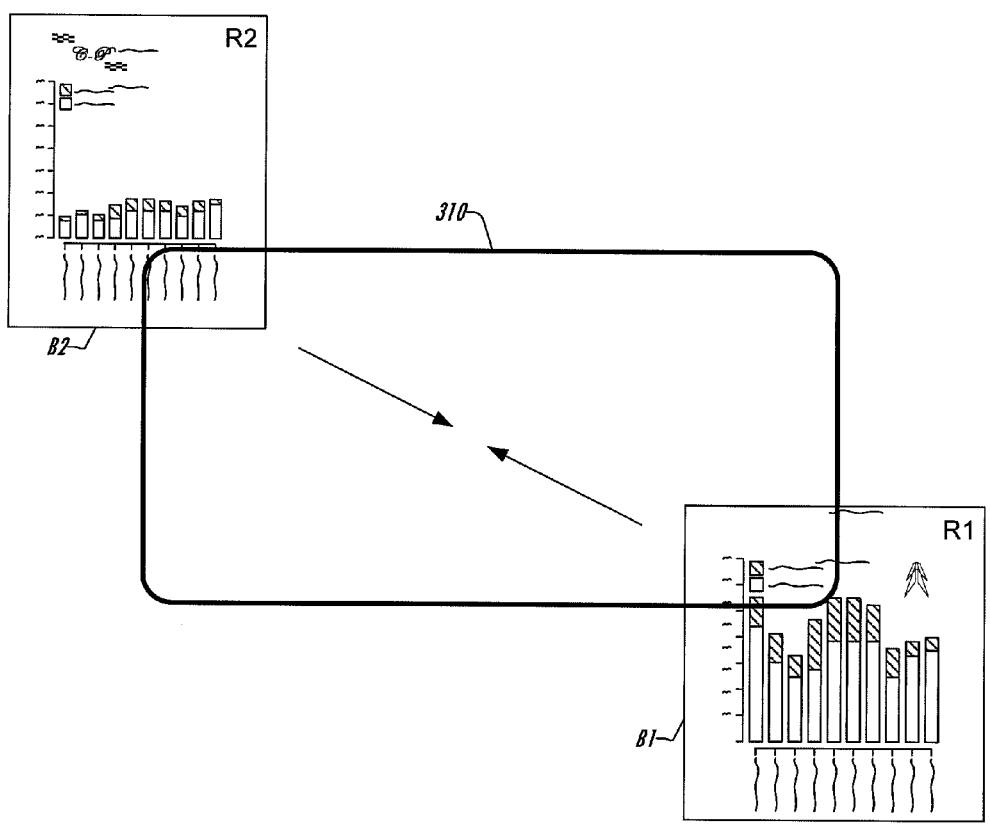
FIG. 10 is a simplified display view illustrating operation by the comparison tool to optionally resize one or both of the visual content regions and to bring the selected content regions together on the display.
Figure 11:
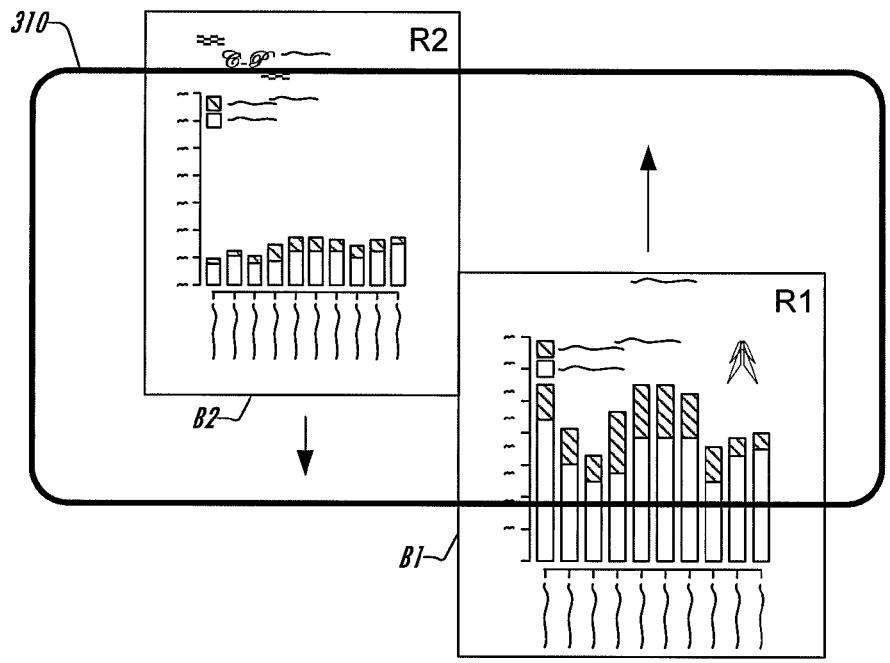
FIG. 11 is a simplified display view illustrating the tool bringing the selected visual content regions together and sliding along one another.
Figure 12:
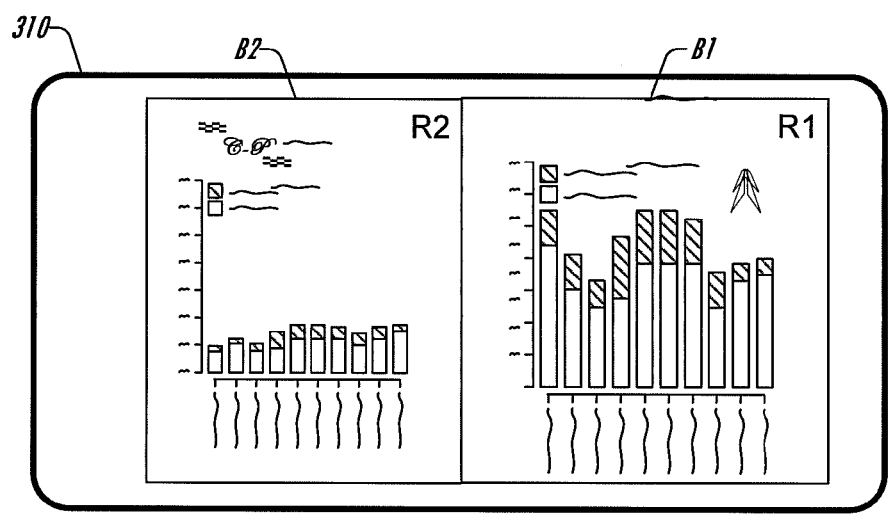
FIG. 12 is a simplified display view illustrating the tool having positioned the selected content regions in a side-by-side arrangement to facilitate user comparison of the selected content regions for a portrait view orientation of the display screen.

The tool makes a determination at 32 in FIG. 1B as to whether more than two content regions have been identified or defined. In the illustrated example of FIG. 9, only two regions R1 and R2 have been identified, and the process thus proceeds to 34 where the tool may resize one or both of the identified content regions R1 and/or R2 according to the relative aspect ratios of the regions as determined by the tool-generated boundaries B1 and B2, and according to the current display size and current display orientation. For example, the display condition in FIG. 9 is in a "landscape" orientation. Referring also to FIG. 10, the tool in this case brings the first and second identified content regions toward one another (36 in FIG. 1B) in the directions shown by the arrows in FIG. 10. In one possible implementation, the user will see the regions approaching one another as shown, and the regions R1 and R2 approach one another and may optionally touch as shown in FIG. 11 and then slide alongside one another as shown by the arrows in FIG. 11 until they reach final positions as shown in FIG. 12. In this case, the regions R1 and R2 end up in final positions in a "side-by-side" arrangement, with the regions R1 and R2 being automatically resized by the compare tool in order to somewhat optimize the display area, without the user having to adjust any zoom settings. The tool in this regard determines whether the final positions will be side to side or "up and down" or other relative positioning's based on the relative aspect ratios of the regions R1 and R2 being brought together for comparison, as well as according to the current display size and current display orientation. Thus, the final positions shown in FIG. 12 are particularly advantageous when the display is in a landscape orientation as shown.

Figure 13:
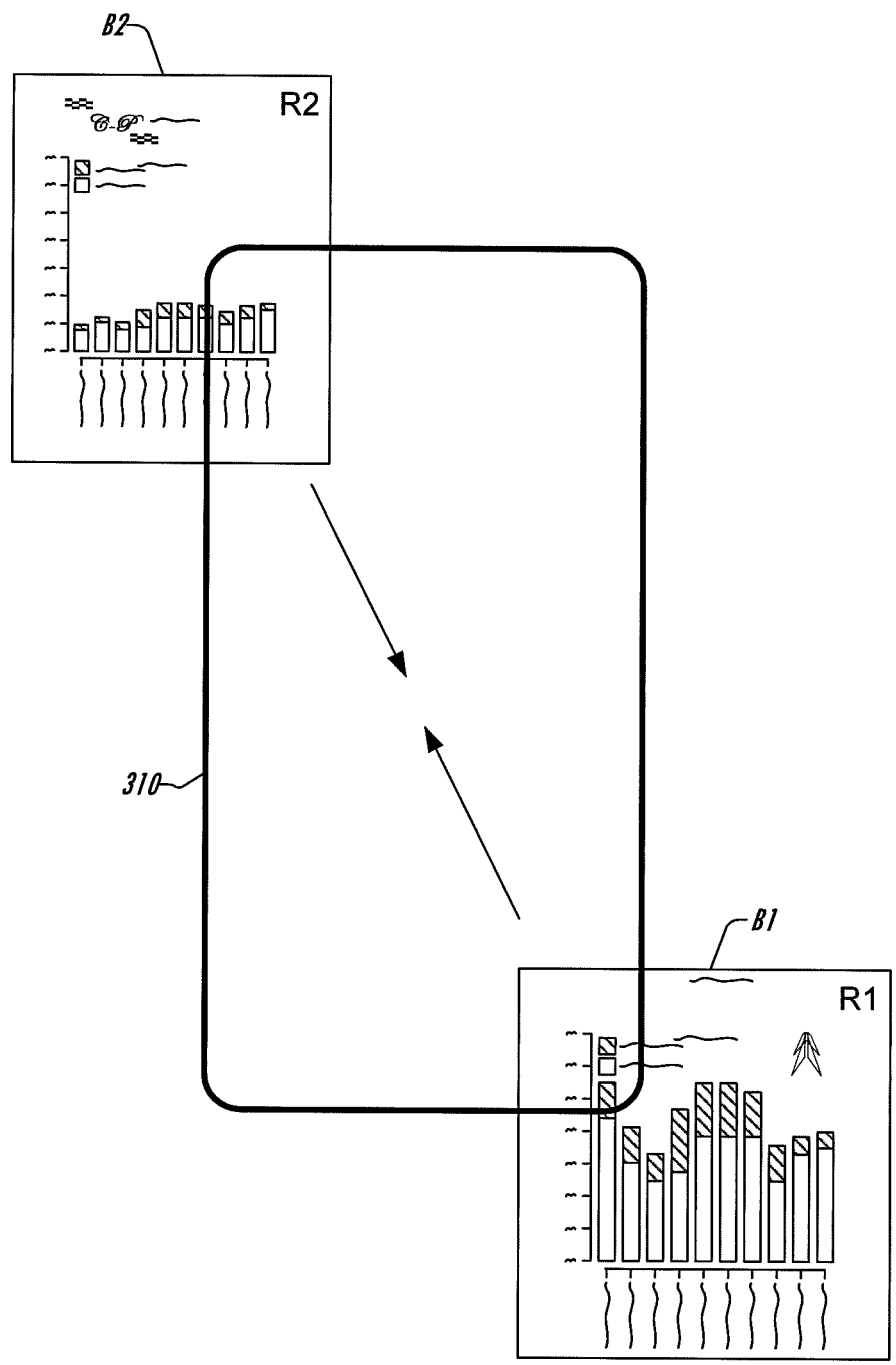
FIGS. 13-15 are simplified display views showing the tool bringing the selected visual content regions together, sliding along one another, and being positioned in final positions one on top of the other for user comparison in a portrait view orientation of the display screen.
Figure 14:
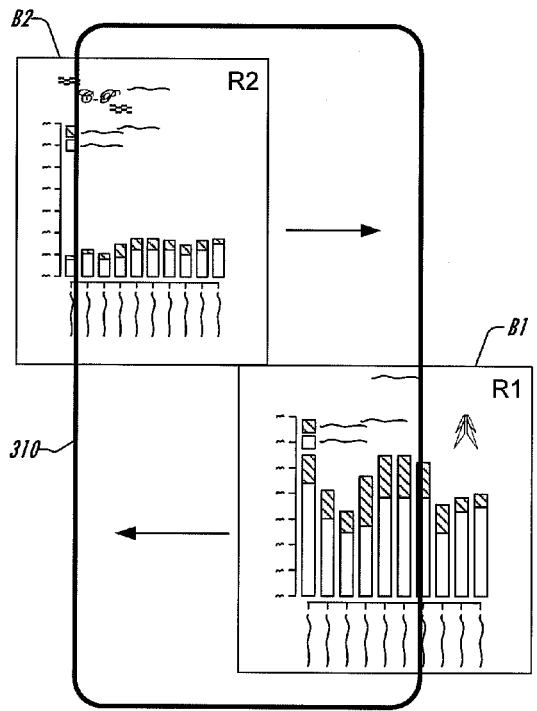
Figure 15:
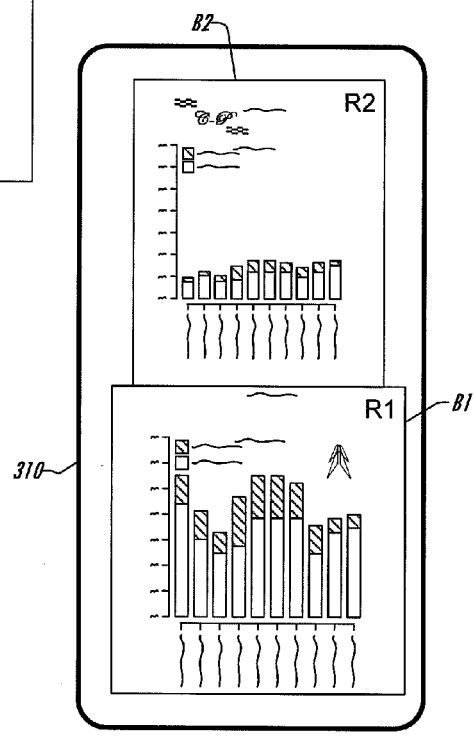

Referring briefly to FIGS. 13-15, a "portrait" display orientation example is illustrated, again using the previously discussed first and second regions R1 and R2 from the source file 100. As seen in FIG. 13, upon the user initiating the second type of user input (e.g., touchscreen pinch operation), the tool optionally resizes one or both of the identified content regions at 34 in FIG. 1B, and then brings the identified content regions R1 and R2 together on the display 310, where the user initially sees the proximate corners of the regions R1 and R2 approaching one another as shown in FIG. 13, and then sees the regions optionally touching and sliding alongside one another as shown in FIG. 14, eventually reaching final positions as seen in FIG. 15, in this case in a "top to bottom" configuration best suited to the portrait type orientation of the touchscreen display 310.

In this regard, the compare tool may advantageously follow reorientation of the user device display 310 if the user reconfigures the positioning of the user device 302. For example, as is known for tablet computers, smart phones, etc., reorienting the physical position of the user device 302 may result in the display orientation changing from portrait to landscape view or vice versa, and the compare tool of the present disclosure may follow such reorientations and reconfigure the relative sizing and relative orientation of the content regions R1 and R2 accordingly. As seen in FIG. 15, moreover, the illustrated example provides for positioning of the identified regions based on their relative locations in the original source file 100, in this case resulting in R2 being positioned above R1, although other approaches may be used, for example, always organizing the regions based on the order in which they were originally identified in the source file 100.

Figure 1C:
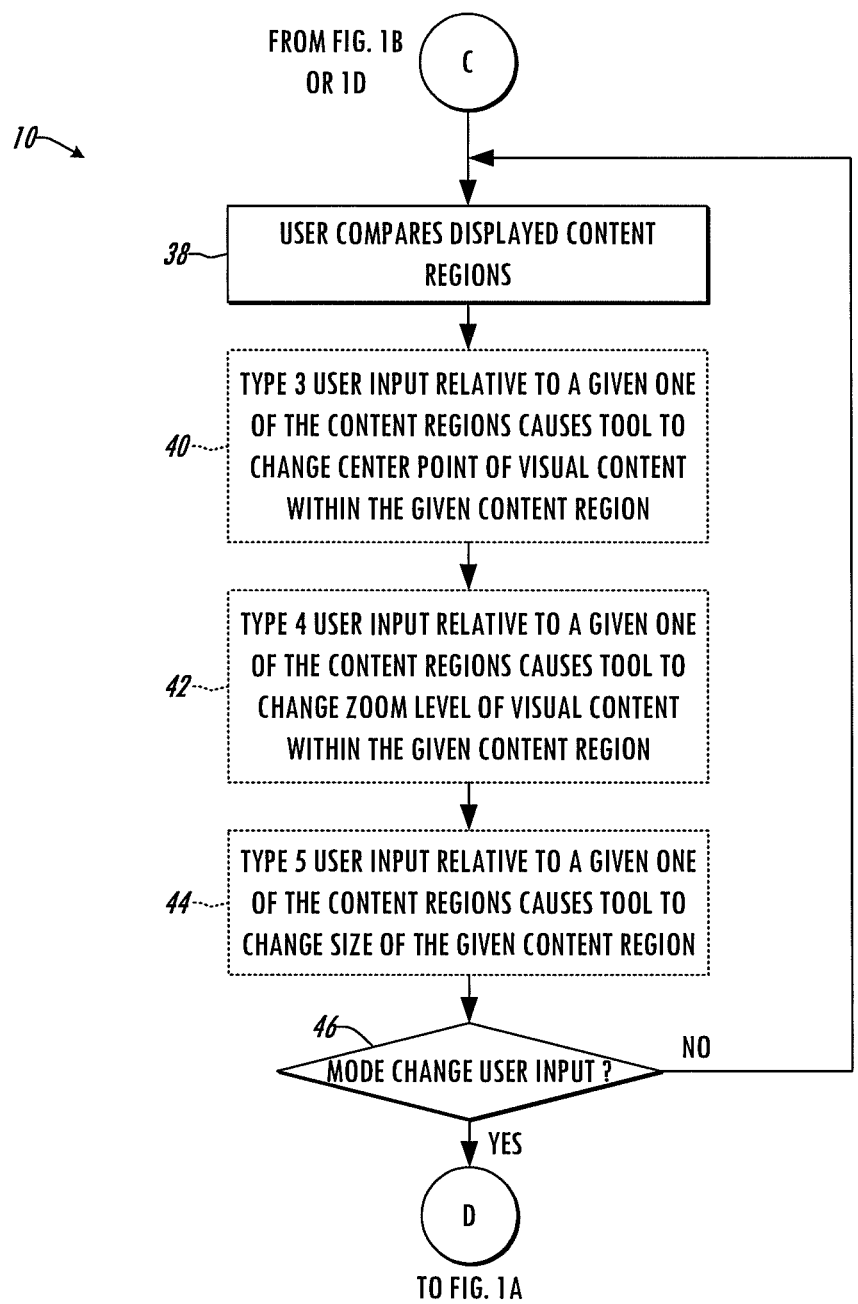
Figure 16:
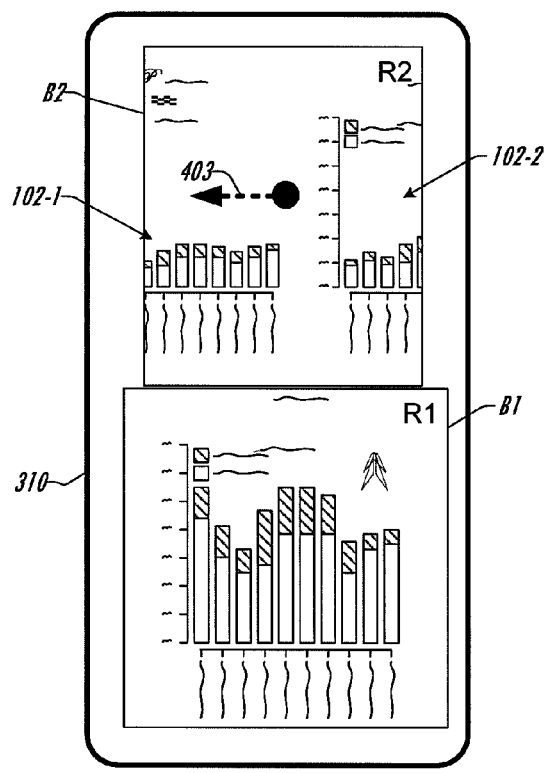
FIG. 16 is a simplified portrait display view illustrating user input to shift a content center point of one of the selected content regions to the left.

Referring also to FIG. 1C and FIGS. 15-19, the user may then compare the displayed content regions R1 and R2 as shown in FIG. 15 (38 in FIG. 1C). In certain situations, the user may wish to further adjust the graphical renderings associated with the identified regions R1 and/or R2. Accordingly, various further user inputs may be used for such purposes. For instance, the user may initiate a third type of input 403 (TYPE 3) at 40 in FIG. 1C relative to a given one of the content regions, such as region R2 in FIG. 16 in order to change the center point of the visual content within the region. As shown in FIG. 16, for instance, the user may touch and slide to the left via the motion shown at 403, with the tool responding by changing the content from the original source file 100 within the displayed boundary box B2 as shown in the figure. In this case, this results in concurrent display of a portion of the graph 102-1 and the next bar graph 102-2 (seen in FIG. 2 above). Other types and forms of user input 403 may be used in order to implement adjustment by the user of the center point of the content displayed within a given one of the regions R1 and R2.

Figure 17:
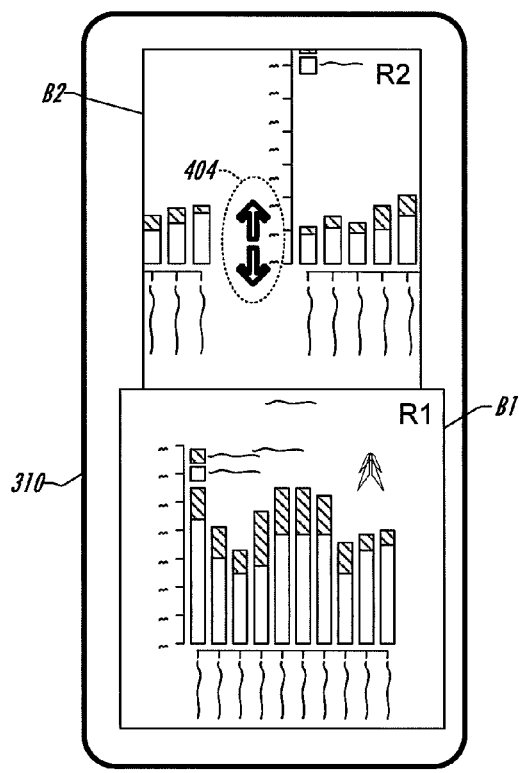
FIG. 17 is a simplified display view illustrating another user input to change a zoom level of one of the selected content regions.

At 42 in FIG. 1C, moreover, the user may perform a fourth type of user input (TYPE 4) in order to cause the tool to change the zoom level of the visual content within a given content region. As shown in FIG. 17, for example, the user may provide a touchscreen input 404 which includes touching the display screen at two points and moving one of the touched points directly away from the other, such as a "zoom in" action found in many touchscreen device applications. In response to the user input 404, the compare tool changes the zoom level of the visual content displayed in the region R2 as shown, in this case zooming in. In another possible example, the user may employ a pinching operation in a touchscreen display 310 within the region R2 in order to increase the amount of visual content displayed in the region R2 (zoom out, not shown). Other types and forms of user inputs may be employed for zooming out or zooming in or otherwise adjusting the zoom level of the content displayed within a given one of the compared regions R1 and R2.

Figure 18:
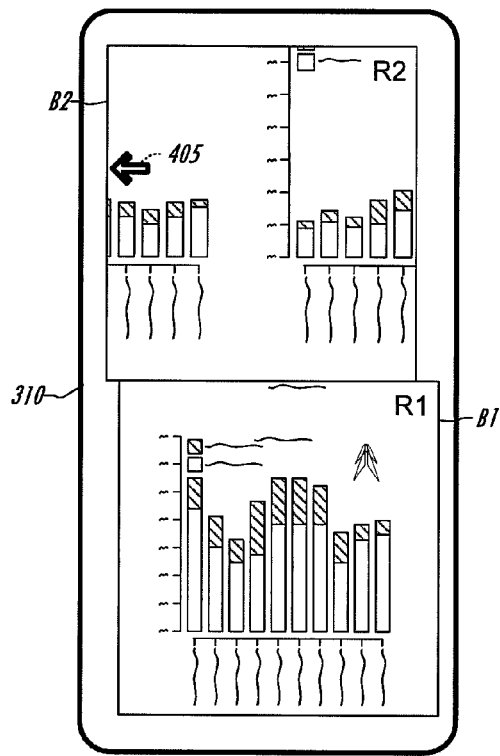
FIG. 18 is a simplified display view illustrating a further user input to resize one of the selected content regions.
Figure 19:
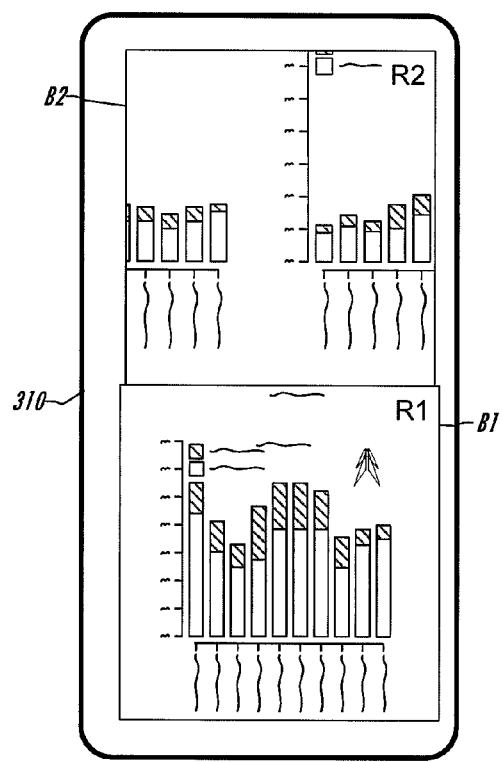
FIG. 19 is a simplified display view illustrating realignment of the selected content regions following the user-initiated resizing of FIG. 18.

At 44 in FIG. 1C, the user may optionally provide a fifth type of user input (TYPE 5) relative to a given content region in order to change the size of that region. For example, FIG. 18 illustrates a user action 405 by touching a left side of the boundary box B2 and sliding to the left via a touchscreen display 310, with the compare tool responding by increasing the lateral extent of the boundary B2 and hence increasing the amount of visual content shown within the region R2. Thus, the user may now view the bar graph associated with July 2004 in FIG. 18, which was not previously shown as viewable in FIG. 17. As seen in FIG. 19, moreover, the tool may automatically realign the displayed regions R1 and R2 following such a size adjustment, for example, by sliding the region R2 slightly to the right as shown.

The tool determines at 46 in FIG. 1C whether the user has provided a mode change input. If not (NO at 46), the user can continue to compare the displayed content regions R1 and R2 at 38 and make any necessary adjustments to one or both of the regions at 40, 42 and/or 44. Once the user changes the mode (YES at 46), the process 10 returns to the SELECT mode at 16 in FIG. 1 as described above.

Figure 20:
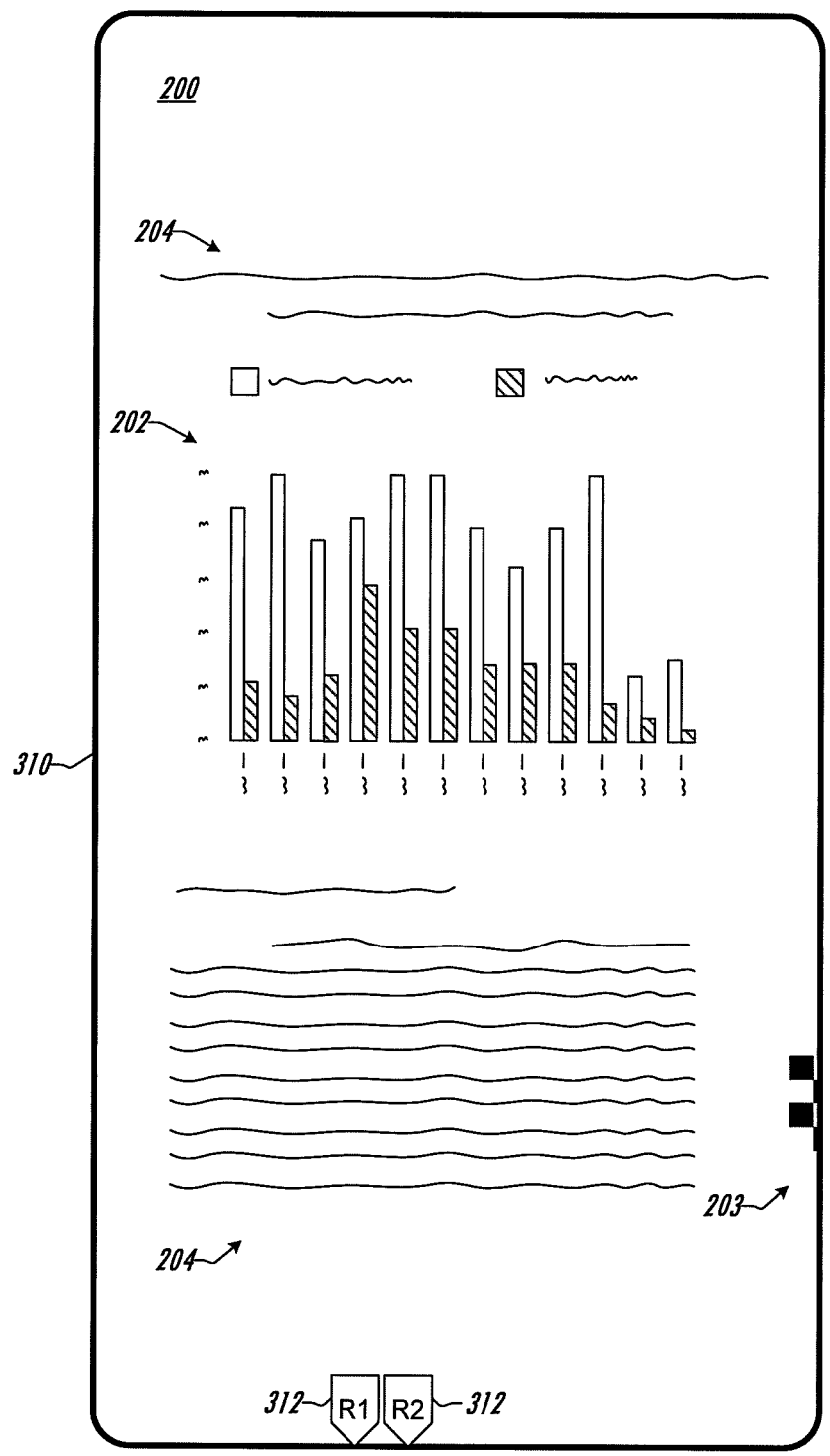
FIG. 20 is a simplified display view illustrating portions of the second source file of FIG. 3 following user changing back to selection mode and navigating to the second source file.
Figure 21:
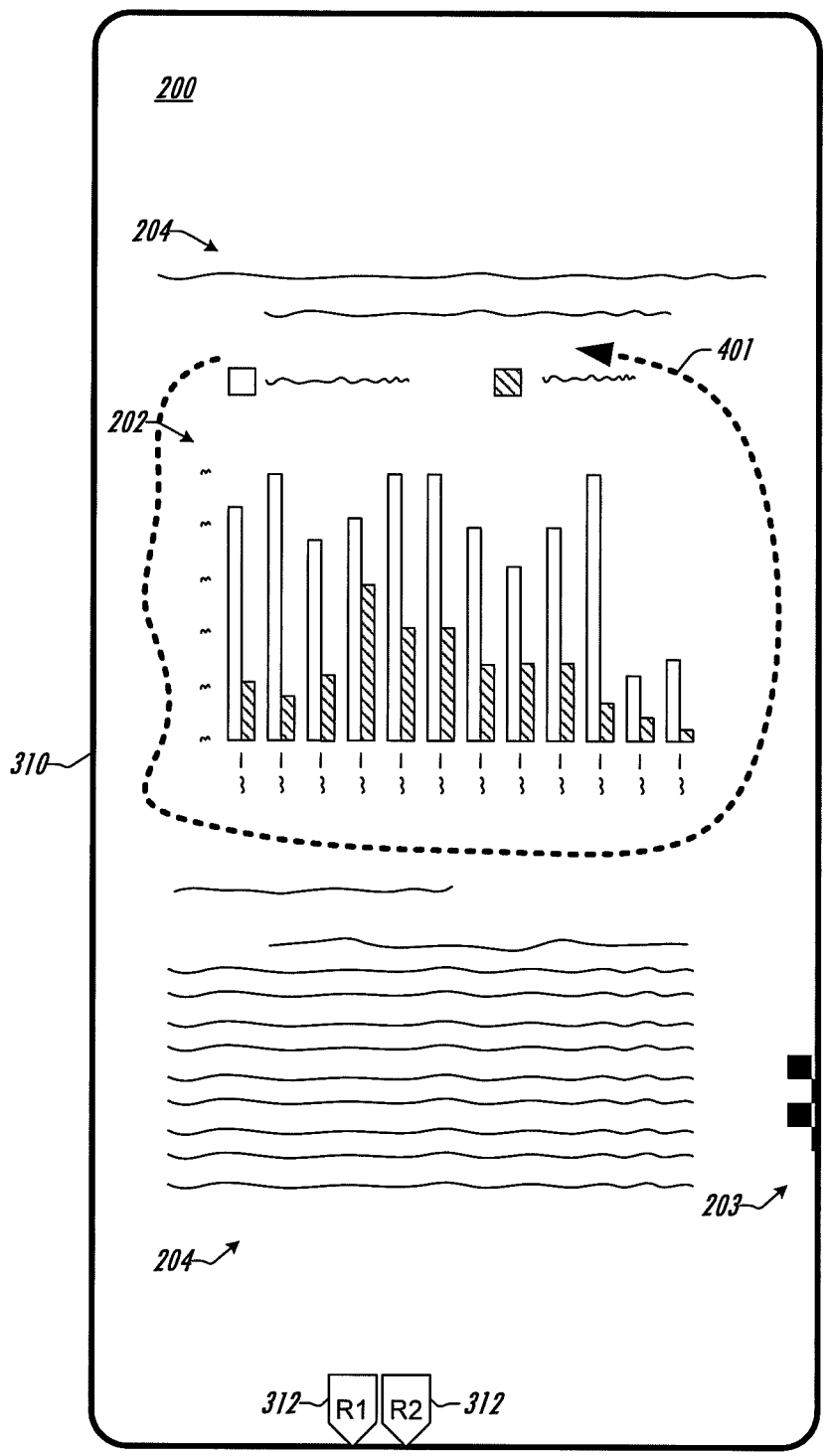
FIG. 21 is a simplified display view illustrating user input in the selection mode to identify a third selected visual content area in the second source file of FIGS. 3 and 20.
Figure 22:
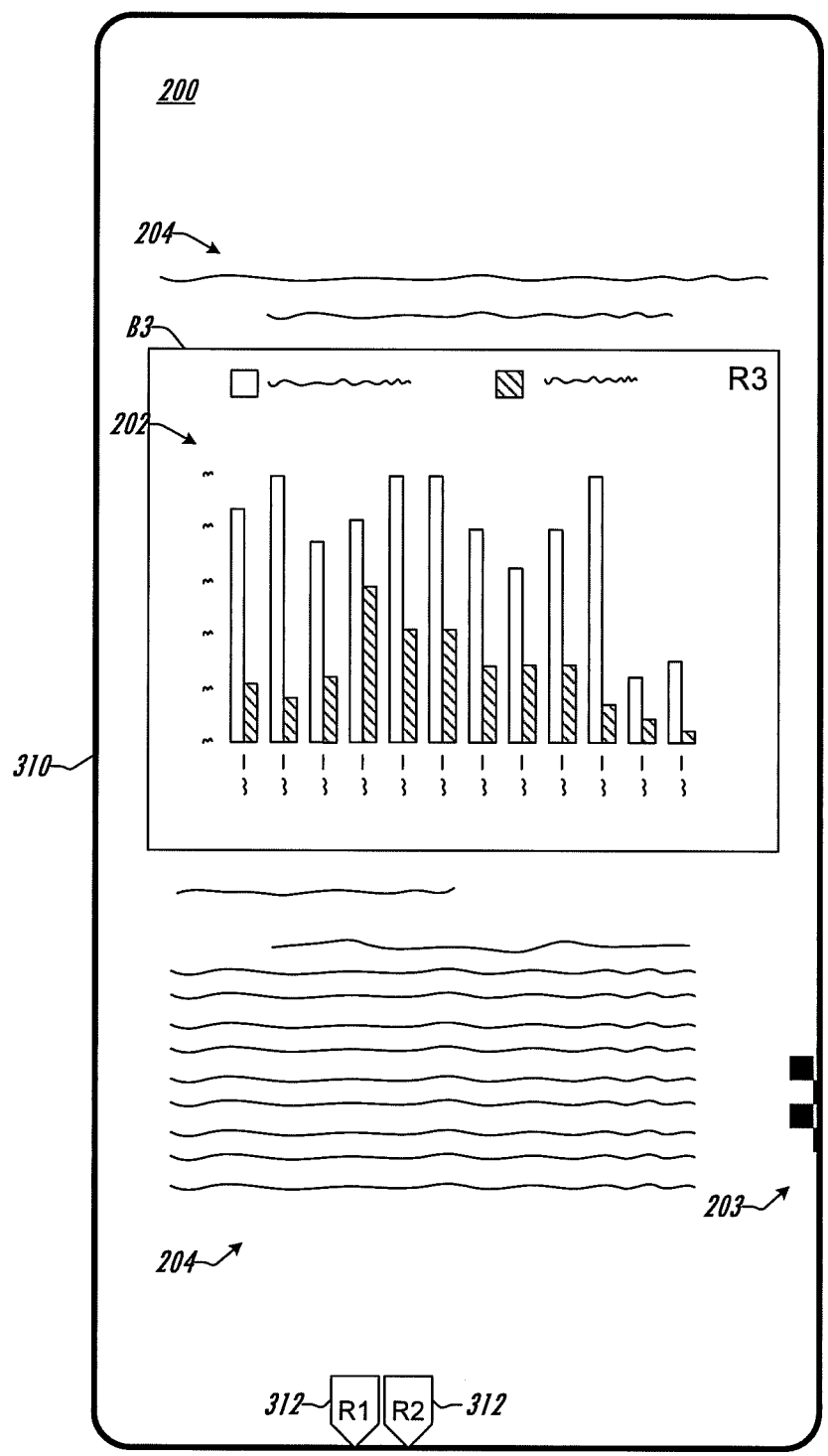
FIG. 22 is a simplified display view illustrating a third boundary generated by the comparison tool which defines a third content region including visual content identified by the third user-selected content area of FIG. 21.

Referring now to FIGS. 1B, 1D and 20-26, the compare tool may, in certain embodiments, allow the user to designate or define more than two regions R in the selection mode. As seen in FIG. 1B, for example, once first and second regions R1 and R2 have been defined, the process 10 proceeds to 26, where the user may optionally navigate the display to a further specific location within the same or another source file at 27 (e.g., within source file 100 of FIG. 2 or source file 200 of FIG. 3 above), and may perform a TYPE 1 user input at 28 to identify a further selected visual content area in the current display view. As shown in FIG. 20, for instance, the user may navigate at 27 to a portion of the source file 200 shown in FIG. 20, which includes text portions 204, a bar graph portion 202, and a portion of a graphical element 203, and may thereafter provide an encircling type input 401 as shown in FIG. 21.

Figure 23:
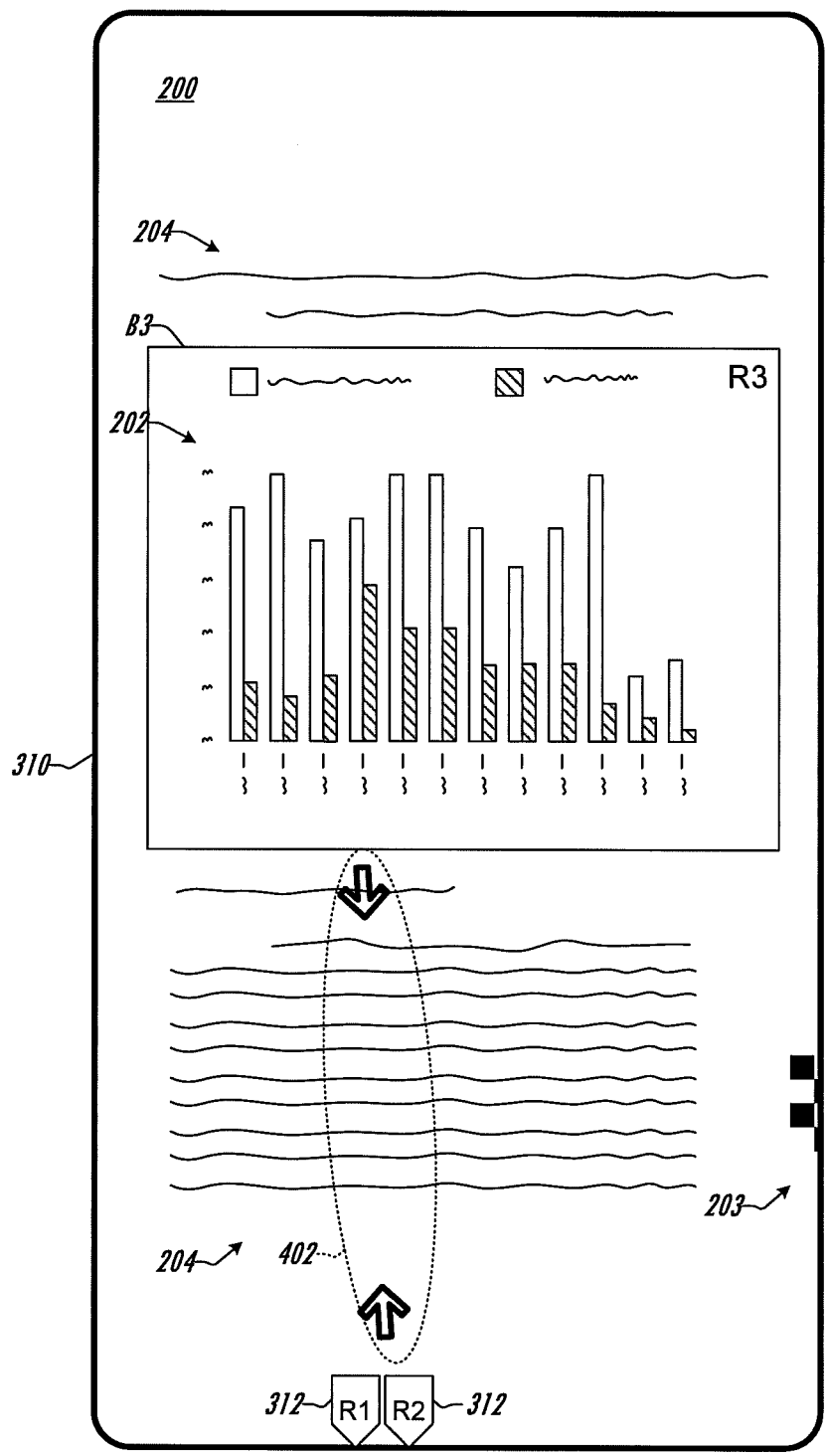
FIG. 23 is a simplified display view illustrating a user input to resume comparison mode with the newly identified third content region.

As seen in FIGS. 20 and 21, moreover, the exemplary compare tool provides the indicators 312 at the bottom of the screen to tell the user that previously defined regions R1 and R2 exist and are in a separate source file (e.g., from source file 100 of FIG. 2 in this case). At 29 in FIG. 1B, the tool generates and displays a further boundary B3 shown in FIG. 22 defining a third region R3 including visual content identified in the source file 200 by the further selected content area. Referring also to FIG. 23, the user may then initiate the COMPARE mode at 30 and FIG. 1B, and the tool determines at 32 that more than two content regions have been defined (YES at 32). For example, as seen in FIG. 23, the user may perform a pinching operation via a user input 402 indicating the desire to compare the newly identified region R3 with one or both of the previously defined regions R1 and/or R2.

Figure 1D:
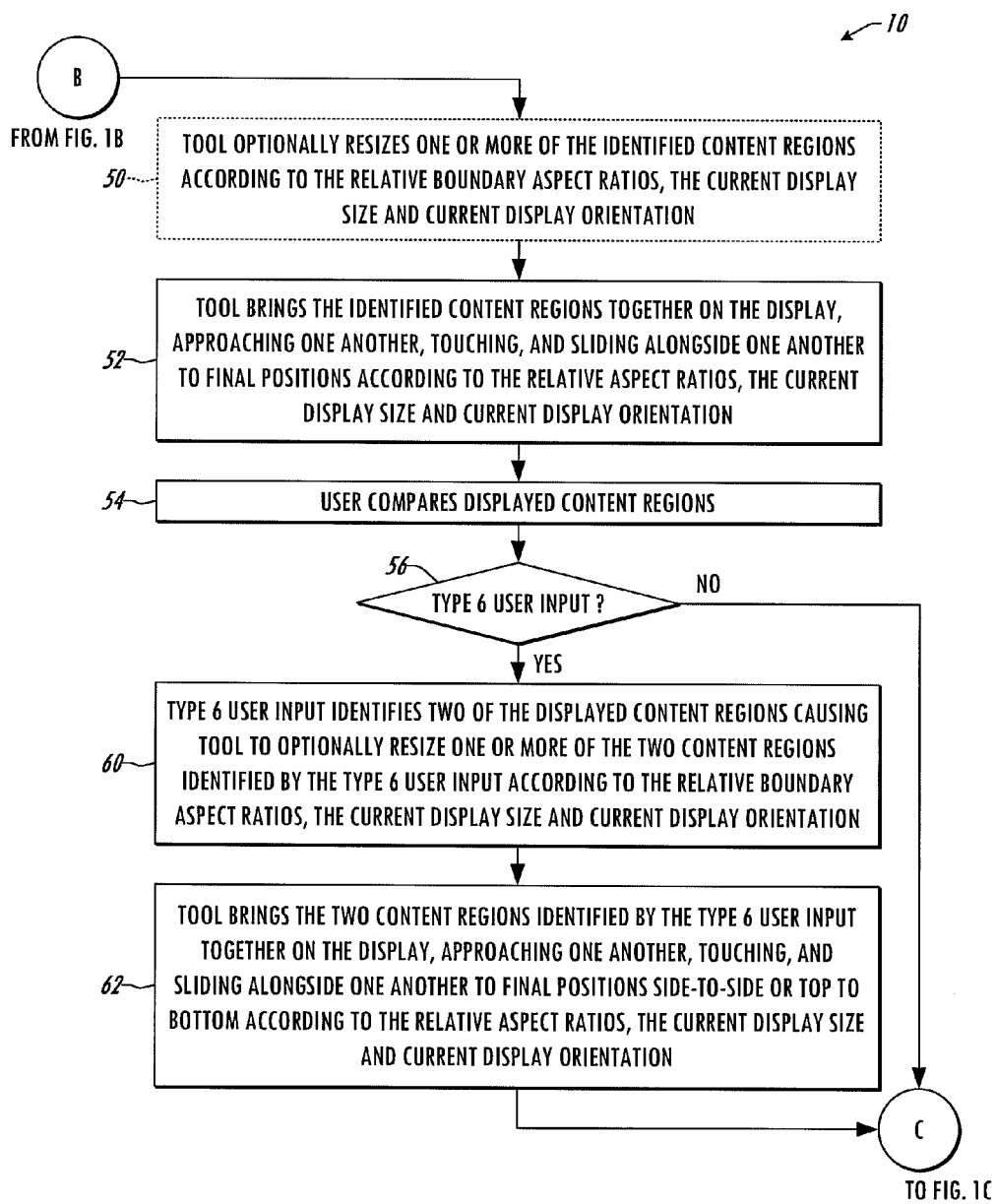
Figure 24:
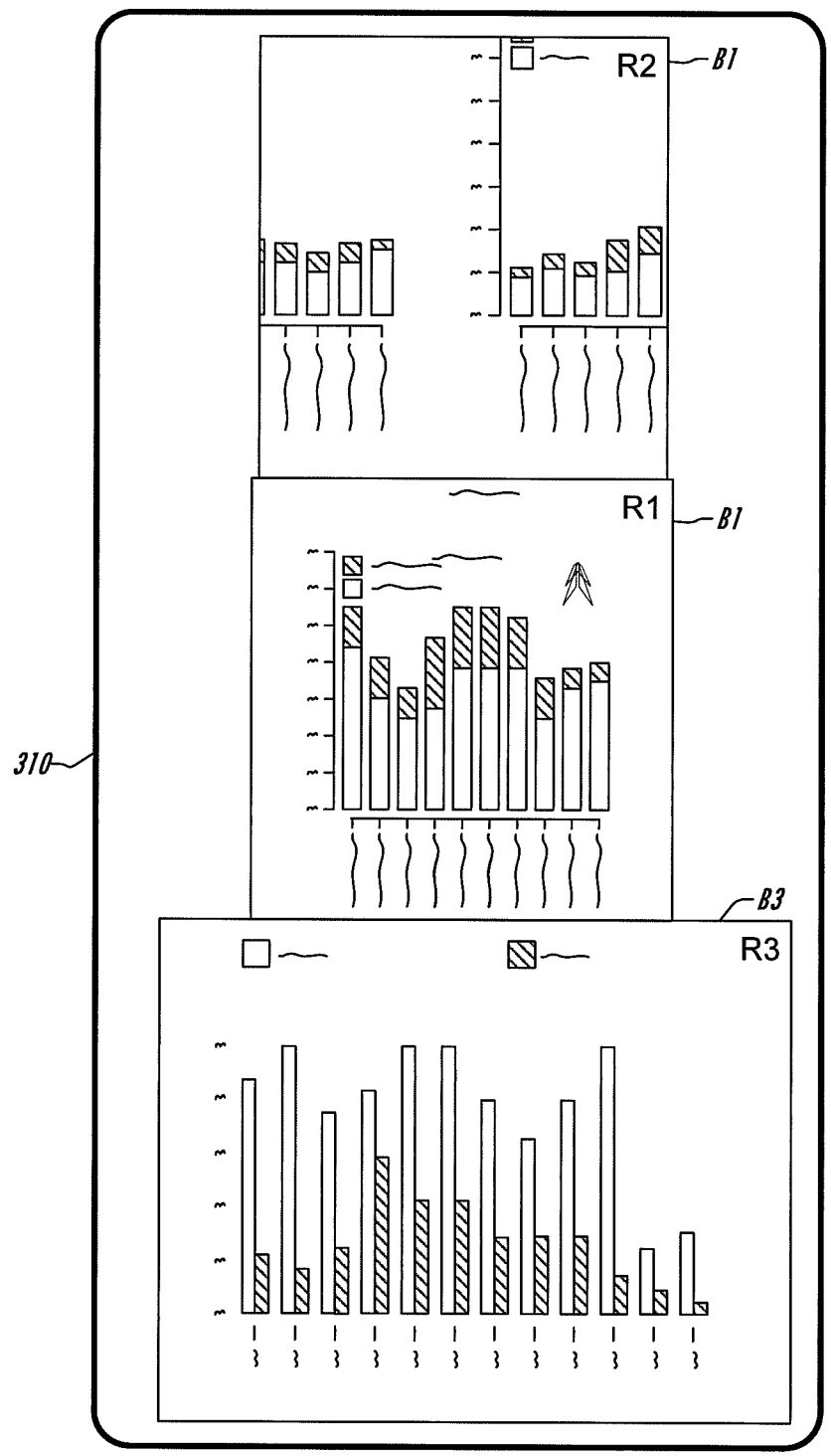
FIG. 24 is a simplified display view showing the three selected visual content regions displayed vertically in a portrait view display orientation.
Figure 25:
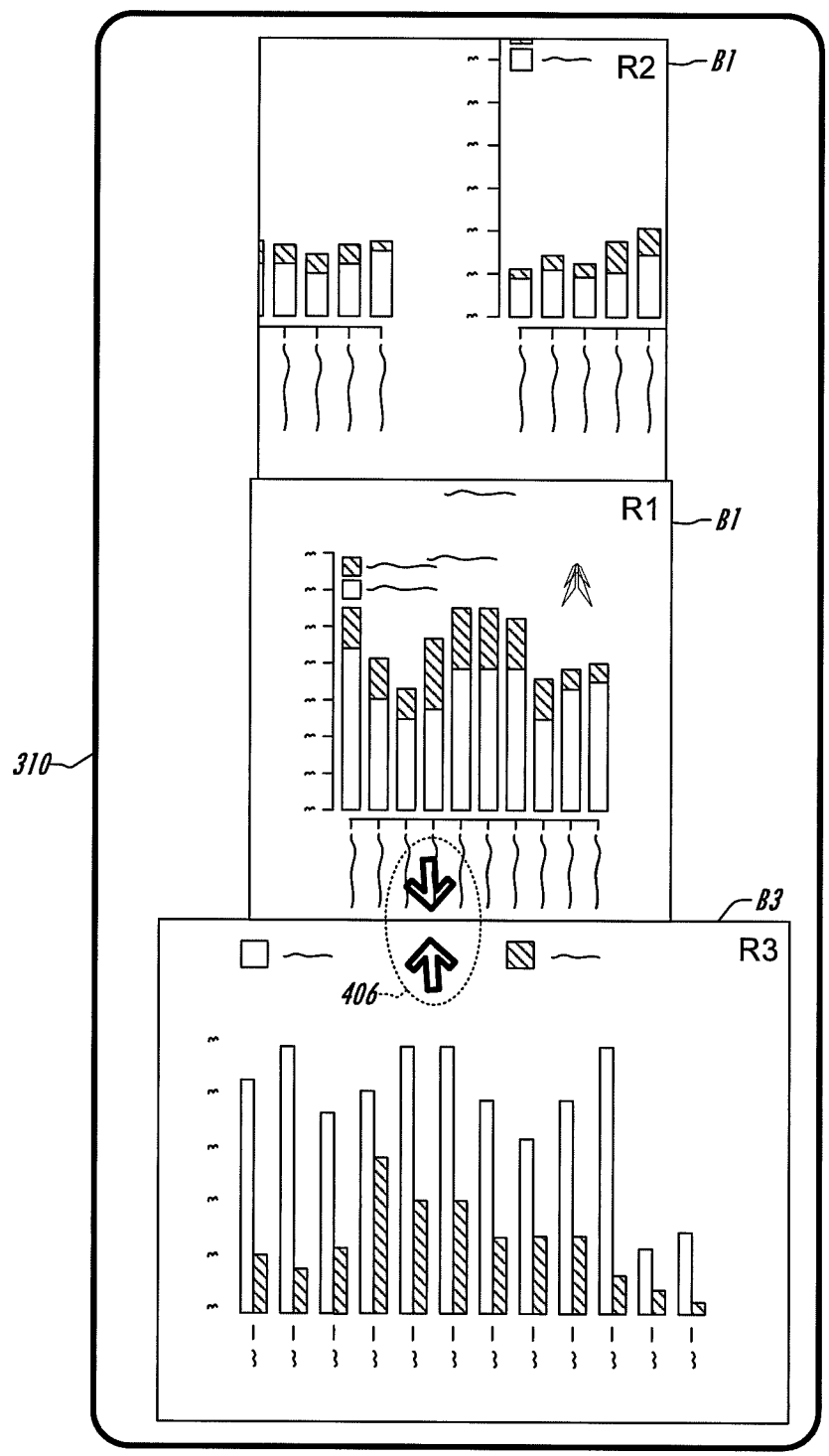
FIG. 25 is a simplified display view showing user input to identify the first and third user-selected content regions.

The process 10 then continues in FIG. 1D, where the tool optionally resizes one or more of the content regions R1-R3 according to the relative boundary aspect ratios, the current display size and the current display orientation. In the exemplary portrait mode orientation of FIG. 24, for instance, the tool then brings the identified content regions together on the display at 52 in FIG. 1D, with the regions R1-R3 initially being displayed approaching one another, touching and sliding alongside one another to final positions as shown. The user may then compare the displayed content regions at 54 in FIG. 1D as shown in FIG. 24.

Figure 26:
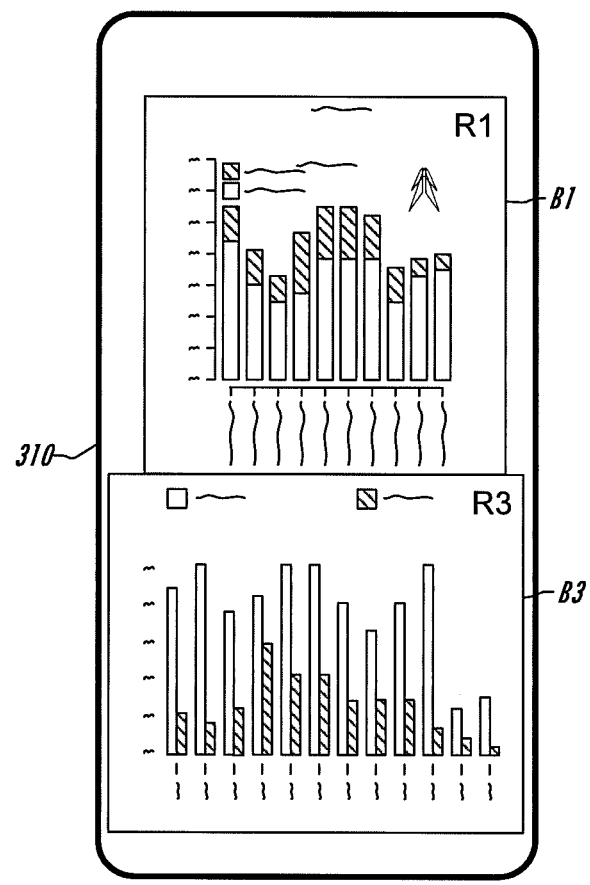
FIG. 26 is a simplified display view showing the selected first and third content regions displayed one on top of the other in a portrait view display orientation by the comparison tool.

At 56, the tool determines whether a further user input of a sixth type (TYPE 6) has been received, and if not (NO at 56), the process 10 proceeds to allow for user region comparison and region adjustment at 38-46 in FIG. 1C as described above. Otherwise (YES at 56 in FIG. 1D), the system receives a further input of the sixth type, such as a pinching action 406 shown in FIG. 25 indicating the user desire to make a one-on-one comparison of two of the displayed regions, in this case R1 and the newly defined region R3. In response, the tool optionally resizes one or both of the regions R1 and/or R3 at 60 in FIG. 1D according to the relative aspect ratios of these regions, the display size and orientation, and then brings the two designated regions R1 and R3 together on the display as shown in FIG. 26, with the regions being shown approaching one another, touching and sliding alongside one another to the illustrated final positions (top to bottom due to the portrait display orientation in this case). The process 10 then returns for user comparison and adjustment and/or mode change in FIG. 1C as described above.

In other possible implementations in which more than two content regions R have been defined, the tool may allow the user to zoom out upon definition of the third region R3 in order to see the relative locations of all marked regions within a given source file. For example, if the third region R3 had been defined within the first source file 100 of FIG. 2, the compare tool would provide a "zoomed out" view at a sufficiently high level to show the relative locations within the source file 100 of the three designated regions R1-R3. Other potential zoomed out views could be created to indicate relative positions of more than two regions that are identified in more than a single source file. From such view, the user could initiate a pinching operation to join two particular regions for close up comparison. In other possible embodiments, the user may be provided with a palette to which each identified region R could be dragged using appropriate user interface input actions, and then the user could click on the palette for side-by-side or top to bottom comparison of two or more of the defined regions R.

In other possible embodiments, the user could drag an identified region R that is visible on a currently displayed screen to a menu or icon in a sidebar, and the screen could split into two, where the original content in the region R that was dragged to the icon is shown in one portion of the screen display, and the other portion of the screen display could allow the user to scroll through the other marked regions R one by one, potentially providing an icon which the user could press or bump over and over again to scroll through the other marked regions R. Once a candidate has been identified by the user for comparison with the most recently identified region R, the user could press the candidate region, and the tool would enter the compare mode, for example, as described above to provide side-by-side or top to bottom orientation of the designated regions for user visual comparison.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software or firmware, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A computer-implemented process for comparing select portions of one or more source files, the process comprising using at least one processor:
   in response to receiving a first type of user input identifying a first selected visual content area in a current display view rendered on a display associated with a user device, generating a first boundary defining a first content region including visual content identified by the first selected visual content area;
   in response to receiving the first type of user input identifying a second selected visual content area in the same or another display view currently rendered on the display, generating a second boundary defining a second content region including visual content identified by the second selected visual content area;
   in response to receiving a second type of user input, bringing the first and second content regions together on the display, including displaying the first and second content regions approaching one another and sliding relative to one another to final positions for visual comparison by a user according to relative shapes of the first and second content regions, a current display size of the display and a current display orientation of the display;
   after generating the first boundary defining the first content region, in response to a user navigating content presented in the display of a source file to a location which does not include the first content region, selectively displaying a region identifier that indicates the relative positioning of the first content region;
   after generating the second boundary defining the second content region in the same source file when the content presented in the display of the source file does not include the first content region, continuing display of the region identifier to notify the user that there is another region currently not displayed which may be compared to the second content region; and
   in response to receiving the second type of user input relative to the displayed second boundary and the displayed region identifier, bringing the first and second content regions together on the display, including displaying the first and second content regions approaching one another and sliding relative to one another to final positions for visual comparison by the user according to relative shapes of the first and second content regions, the current display size of the display and the current display orientation of the display.

2. The process of claim 1, wherein bringing the first and second content regions together on the display comprises the first and second content regions touching one another and sliding relative to one another to the final positions in which the first and second content regions are positioned side to side or top to bottom relative to one another according to relative aspect ratios of the first and second content regions, the current display size of the display and the current display orientation of the display.

3. The process of claim 1, comprising automatically resizing at least one of the first and second content regions according to the relative sizes of the first and second content regions, the current display size of the display and the current display orientation of the display.

4. The process of claim 1, comprising in response to receiving a third type of user input relative to a given one of the content regions, changing a center point of visual content within the given content region.

5. The process of claim 1, comprising in response to receiving a fourth type of user input relative to a given one of the content regions, changing a zoom level of visual content within the given content region.

6. The process of claim 1, comprising in response to receiving a fifth type of user input relative to a given one of the content regions, changing a size of the given content region.

7. The process of claim 1, comprising:
   in response to receiving the first type of user input identifying a third or subsequent selected visual content area in the same or another display view currently rendered on the display, generating a corresponding third or subsequent boundary defining a corresponding third or subsequent content region including visual content identified by the third or subsequent selected visual content area; and
   bringing a plurality of the content regions together on the display, including displaying the plurality of the content regions approaching one another and sliding relative to one another to final positions for visual comparison by the user according to relative shapes of the plurality of the content regions, the current display size of the display and the current display orientation of the display.

8. The process of claim 7, wherein the first selected visual content area includes visual content from a first source file, and wherein the second selected visual content includes visual content from a second source file.

9. The process of claim 1, wherein the display is a touchscreen display, and wherein the first type of user input is a circling operation caused by the user touching the touchscreen display and at least partially encircling the selected visual content area in the display view.

10. The process of claim 9, wherein the second type of user input is a pinching operation caused by the user touching two separate portions of the touchscreen display and sliding at least one of the touched portions toward the other touched portion.

11. The process of claim 1, wherein the display is a touchscreen display, and wherein the second type of user input is a pinching operation caused by the user touching two separate portions of the touchscreen display and sliding at least one of the touched portions toward the other touched portion.

12. The process of claim 1, wherein the first selected visual content area includes visual content from a first source file, and wherein the second selected visual content includes visual content from a second source file.

13. A user device for comparing select portions of one or more source files, comprising:
   a user interface with a display, the user interface operative to receive user inputs; and
   at least one processor operatively coupled with an electronic memory and with the user interface, the at least one processor being programmed to:
      in response to receiving a first type of user input identifying a first selected visual content area in a current display view rendered on a display associated with a user device, generating a first boundary defining a first content region including visual content identified by the first selected visual content area;

in response to receiving the first type of user input identifying a second selected visual content area in the same or another display view currently rendered on the display, generating a second boundary defining a second content region including visual content identified by the second selected visual content area;

in response to receiving a second type of user input, bringing the first and second content regions together on the display, including displaying the first and second content regions approaching one another and sliding relative to one another to final positions for visual comparison by a user according to relative shapes of the first and second content regions, a current display size of the display and a current display orientation of the display;

after generating the first boundary defining the first content region, in response to a user navigating content presented in the display of a source file to a location which does not include the first content region, selectively displaying a region identifier that indicates the relative positioning of the first content region;

after generating the second boundary defining the second content region in the same source file when the content presented in the display of the source file does not include the first content region, continuing display of the region identifier to notify the user that there is another region currently not displayed which may be compared to the second content region; and in response to receiving the second type of user input relative to the displayed second boundary and the displayed region identifier, bringing the first and second content regions together on the display, including displaying the first and second content regions approaching one another and sliding relative to one another to final positions for visual comparison by the user according to relative shapes of the first and second content regions, the current display size of the display and the current display orientation of the display.

14. The user device of claim 13, wherein display is a touchscreen display.

15. The user device of claim 13, wherein the user interface is operative to receive at least one of the first and second types of user input from a mouse.

16. A non-transitory computer readable medium, comprising computer executable instructions for:

in response to receiving a first type of user input identifying a first selected visual content area in a current display view rendered on a display associated with a user device, generating a first boundary defining a first content region including visual content identified by the first selected visual content area;

in response to receiving the first type of user input identifying a second selected visual content area in the same or another display view currently rendered on the display, generating a second boundary defining a second content region including visual content identified by the second selected visual content area;

in response to receiving a second type of user input, bringing the first and second content regions together on the display, including displaying the first and second content regions approaching one another and sliding relative to one another to final positions for visual comparison by a user according to relative shapes of the first and second content regions, a current display size of the display and a current display orientation of the display;

after generating the first boundary defining the first content region, in response to a user navigating content presented in the display of a source file to a location which does not include the first content region, selectively displaying a region identifier that indicates the relative positioning of the first content region;

after generating the second boundary defining the second content region in the same source file when the content presented in the display of the source file does not include the first content region, continuing display of the region identifier to notify the user that there is another region currently not displayed which may be compared to the second content region; and in response to receiving the second type of user input relative to the displayed second boundary and the displayed region identifier, bringing the first and second content regions together on the display, including displaying the first and second content regions approaching one another and sliding relative to one another to final positions for visual comparison by the user according to relative shapes of the first and second content regions, the current display size of the display and the current display orientation of the display.

17. The process of claim 1, wherein the first selected visual content area includes visual content from a first source file, and wherein the second selected visual content area includes visual content from the first source file.

18. The process of claim 1, further comprising displaying the first and second content regions in a side-by-side arrangement or in an up and down arrangement based on the relative aspect ratios of the first and second content regions and based on a current display size and based on whether the display is currently oriented in a landscape or portrait orientation.

19. The process of claim 18, further comprising displaying the first and second content regions in the side-by-side arrangement when the display is currently oriented in the landscape orientation, and displaying the first and second content regions in the up and down arrangement when the display is currently oriented in the portrait orientation.

* * * * *